(12) United States Patent
Kruszewski et al.

(10) Patent No.: US 10,621,068 B2
(45) Date of Patent: Apr. 14, 2020

(54) SOFTWARE CODE DEBUGGER FOR QUICK DETECTION OF ERROR ROOT CAUSES

(71) Applicant: T Komp Tomasz Kruszewski, Bydgoszcz (PL)

(72) Inventors: Tomasz Kruszewski, Bydgoszcz (PL); Adam Kruszewski, Bydgoszcz (PL)

(73) Assignee: REVDEBUG.COM SP. Z O.O., Bydgoszcz (PL)

( * ) Notice: Subject to any disclaimer, the term of this patent is extended or adjusted under 35 U.S.C. 154(b) by 332 days.

(21) Appl. No.: 15/452,694

(22) Filed: Mar. 7, 2017

(65) Prior Publication Data
US 2018/0024911 A1 Jan. 25, 2018

Related U.S. Application Data

(60) Provisional application No. 62/304,598, filed on Mar. 7, 2016.

(51) Int. Cl.
*G06F 11/36* (2006.01)
*G06F 8/41* (2018.01)
*G06F 8/51* (2018.01)

(52) U.S. Cl.
CPC .......... *G06F 11/3664* (2013.01); *G06F 8/41* (2013.01); *G06F 8/447* (2013.01); *G06F 8/51* (2013.01); *G06F 11/3644* (2013.01)

(58) Field of Classification Search
None
See application file for complete search history.

(56) References Cited

U.S. PATENT DOCUMENTS

| | | | | |
|---|---|---|---|---|
| 5,450,586 A | * | 9/1995 | Kuzara | G06F 11/3466 714/1 |
| 7,464,373 B1 | * | 12/2008 | Yunt | G06F 8/10 717/125 |
| 7,484,205 B2 | * | 1/2009 | Venkatapathy | G06F 11/3624 717/158 |
| 8,135,572 B2 | * | 3/2012 | Crawford | G06F 11/3664 703/22 |

* cited by examiner

*Primary Examiner* — Bing Zhao
(74) *Attorney, Agent, or Firm* — K&L Gates LLP; Jordan A. Kwan

(57) ABSTRACT

Example methods, apparatuses, and systems are presented for a software code debugger tool. The code debugger tool may be configured to access source code intended to be examined for debugging. The debugger tool may compile the source code using a specially designed compiler that incorporates state recording functionality and other debugging functionality directly into the source code. When the source code is executed, the debugging tool may be configured to record a plurality of states that the application progresses through upon executing the application. The debugger tool can read recorded states while the application runs or after its execution. Various visual indicators may also provide additional annotations to aid in debugging, such as displaying the content of variables in a visual annotation showing their historical values, and providing a temporal status indicator to provide context to the user about what the present state represents in relation to specific functions in the source code.

20 Claims, 37 Drawing Sheets

400

```
┌─────────────────────────────────────────────────────────┐
│ ⋈  TMExample01 - Microsoft Visual Studio - Experimental Instance │
│ FILE  EDIT  VIEW  PROJECT  BUILD  DEBUG  TEAM  TOOLS  TEST │
│ ⊙ ▼ ⊙ | ⧉ ▼ ⧉ ▣ ⯑ | ↺ ▼ ↻ ▼ | ▷ Start ▽ ↻ ▼ [Debug ▼] | ⧉ │
```

Module1.vb ⊟ X

⧉ Module1

Imports System.Console

⊟ Module Module1　　　　　　　　　　　　　415

⊞ ---Sub Main ()
　　----- Dim fileContent = System.IO.File.ReadAllText("C:\

----- WriteLine("Write anything:")
　　----- Dim userInput = ReadLine()

----- WriteLine("Now, let's sum it up:")

----- Dim result = String.Format("{0} - {1}", fileCont

----- WriteLine(result)

----- ReadKey(True)
　---End Sub

End Module

Module1.vb

Module1

Imports-System.Console

- Module-Module1
  - Sub-Main()
    - "C:\TimeMachine\example.txt" :C:\TimeMachine\example.txt
    - System.IO.File.ReadAllText: This is sample content.
    - Dim-fileContent = System.IO.File.ReadAllText("C:\TimeMachine\example.txt")
    - "Write anything:":"Write anything:"
    - WriteLine("Write-anything:")
    - ReadLine:anything:
    - Dim-userInput = ReadLine()
    - WriteLine("Now, let's-sum-it-up:")
    - Dim-result = String.Format("{0} - {1}", fileContent, userInput)
    - WriteLine(result)
    - ReadKey(True)
  - End-Sub
- End-Module

100%

710

700

705

Symbol view

| State | Variable | Value |
|---|---|---|
| Scope | Module1.Main | |
| | fileContent | This\is\sample\content\. |
| | userInput | anything |

Symbol view

Properties

Solution Explorer | Team Explorer | Class View

FIG. 8B

```
Module1.vb
Module1
Imports System.Console
Module Module1
    Sub Main()
        Dim fileContent = System.IO.File.ReadAllText("C:\TimeMachine\example.txt")
        WriteLine("Write anything:")
        Dim userInput = ReadLine()
        WriteLine("Now, let's sum it up:")
        Dim result = String.Format("{0} - {1}", fileContent, userInput)
        WriteLine(result)
        ReadKey(True)
    End Sub
End Module
```

Annotations (860):
- "Write anything:":"Write anything:"
- ReadLine:anything:
- "Now, let's sum it up:":"Now, let's sum it up:"
- fileContent: This is sample content
- userInput: anything
- "{0} - {1}":"{0} - {1}"
- String.Format:This is sample content - anything
- Dim result = String.Format("{0} - {1}", fileContent, userInput)
- result:This is sample content - anything

850

```
Module1.vb
Module1
  Module-Module1
    Sub-Main()
    Dim-fileContent = System.IO.File.ReadAllText("C:\TimeMachine\example.txt")
        System.IO.File.ReadAllText: This is sample content.
    "Write anything:":"Write anything:"
    WriteLine("Write-anything:")
        "Write anything:"
    Dim-userInput
        Expression        Current Value      Previous value
        "Write anything:" "Write\ anything:" TM:Missing value
    "Now"
    WriteLine("Now, let's-sum-it-up:")
    Dim-result = String.Format("{0}   - {1}", fileContent, userInput)
    WriteLine(result)
    ReadKey(True)
    End-Sub
  End-Module
```

| MyThread.cs ⊠ X | Program.cs | Program.cs | CallingType.cs |

🔑 MultiThread.MyThread

```
private static 'int' _sharedNumber;
public void' someThread()
{
    _random = new Random();
    var max - _random.Next(30, 100);
    Console.WriteLine("Watek   { 0 } wykona petle {1} razy.",
    while (_number < max)
    {
        ++_number;
        _sharedNumber;
        Thread.Sleep(_random.Next(1, 50));
        var text = string.Format("Watek   {0}: {1}", Thread.
        var testFormat = _sharedNumber * 2;
        Console.WriteLine(_sharedNumber + "   \t" + text + "\t"
        if (_random.Next(200) > 180)
        {
            try
            {
                throw new Exception("This is a Handled
            }
            catch
            {
            }
        }
        else
        {
            if (_random.Next(200) > 197)
            {
                throw new Exception("This is an Unhan
            }
        }
    }
}
```

| Program.cs | YieldingType.cs | Program.cs | Program.cs |

▼ ⬡ SomeThread()

Thread.CurrentThread.Name, max);

CurrentThread.Name, _number);

+ testFormat);

Exception."); ← 1010 dled Exception."); ← 1015

```
MultiThread.MyThread
   _____ ++_number;
   _____ _sharedNumber;
   _____ Thread.Sleep(_random.Next(1, 50));
   _____ var text = string.Format("Watek   {0}: {1}", Thread.
   _____ var testForamat = _sharedNumber * 2;
   _____ Console.WriteLine(_sharedNumber + "   \t" + text + "\t"
   _____ if (_random.Next(200) > 180)
   _____ {
   _____ try
   _____ {
   _____ throw new Exception("This is a Handled
   _____ }
   _____ catch
   _____ {

_____ }
   _____ }
   _____ else
   _____ {
                                                        1210
                                          200:200
                              _random.Next:199

_____ if (_random.Next(200) > 197)
   _____ {
                                          "This is an Unhandled
   throw new Exception("This is an Unhan  new Exception("This is an Unhand
   _____
   _____ }
   _____ }
   _____ }
   _____ }
   }
                                                        Thread View
```

FIG. 12-1

▼ ⓘ SomeThread()

CurrentThread.Name, _number);

+ testFormat);

Exception.");

Exception,": This is an Unhandled Exception
led Exception,"): System Exception: This is an Unhandled Exception.
dled Exception.");

FIG. 12-2

| No. | Description of features |
|---|---|
| 1 | Unique file types used by Time Machine tool: tmox, tmxx, timemachine config, class generators based on T4 and XML. |
| 2 | State Ordering - order detection based on last read value. |
| 3 | Application state recovery, continuing/restarting application from recorded state. |
| 4 | Automatic test generator - generate application tests based on recorded states. |
| 5 | Removing excessive sequence points generated by instrumentation code. This functionality allows using original source code files in debug sessions. |
| 6 | Code and AST (Abstract syntax tree) analysis, instrumentation code selection and classification. This is core feature of Time Machine Code Compiler, which allows injection of tracing function into analyzed application. |
| 7 | Tracing operation available independently of build configuration. Time Machine can be used with debug and release build configurations. |
| 8 | Time Machine code transformation: set of rules for processing all available syntax forms of both C# and Visual Basic languages, resulting with injected instrumentation code. |
| 9 | Variable identification and runtime object identification. Algorithms for generation of unique identifiers for each object used by .NET virtual machine. |
| 10 | Nonblocking application state queue. Special object, allowing storage of application state objects, their serialization and transportation to external process. |
| 11 | Time Machine state storage implementation - set of objects, that can be initialized by Time Machine Module, which allow storage of recorded application states using different mediums. User can save states to binary file, to local or external database or send them directly into Microsoft Visual Studio. |
| 12 | Ability to change the destination of saved states in runtime (ie. while the program is executing, you can select to store the states in local file, send them to remote server or send them to IDE all without restarting program execution) |

FIG. 18A

| | |
|---|---|
| 13 | Toggle tracing operation on runtime. Thanks to this feature traced application doesn't have to be rebuild when recording of application states isn't needed and allows turning on recording on user demand. |
| 14 | Recording and aggregation of application states based on source web request. |
| 15 | Omitting code injection for operations resulting with "static" chances (deterministic modifications of value, like A+1). This functionality allows further optimization of Time Machine application state recording (lesser amount of CPU time and memory is needed when application states are recorded). |
| 16 | Time Machine supports wide variety of execution environments: official Microsoft .NET runtime, Open Source Mono runtime, Open Source .NET Core runtime, and also as application running as Web Application on IIS Server and IIS Express (embedded into IDE) |
| 17 | Storing informations about handled and unhandled exceptions. Special processing of existing try/catch/finally blocks, allowing saving normally unavailable informations. |
| 18 | Time Machine Server / receiver and record identification. Set of tools and methods allowing efficient collection of application states from multiple sources. |
| 19 | Application states streaming. Stored informations about historical application runs can take up a lot of memory space, which can be too much for a single workstation. User working with Time Machine may request partial data set from a single moment in time, that can be gradually populated with next subsets on demand. |
| 20 | Application states sanitization. Time Machine will provide tools, which will remove any sensitive data from recorded application states. This is crucial for scenarios, in which Time Machine is dormant on production/live environment and can be turned on on demand. |
| 21 | Time Machine supports extending its storing capabilities and users can add their own custom storing events (ie. storing a particular file as a whole when it is opened/read) or intercepting and changing the built in ones (ie. to anonymous in particular way data being processed). |
| 22 | Code view overlay. Set of visual tools, allowing presentation of specific Time Machine data in code editor window. Those include floating tags with expression value, glyph and tag showing current application state and overview of statements under mouse pointer. |
| 23 | Thread view. Separate window providing information about all threads that had been used in recorded application states. |
| 24 | Web Request View. Separate window providing information about all web requests fetched in recorded application states history. |
| 25 | Handled and unhandled exception visualization. Each exception is treated as a single marker, which can be shown on Thread view or marker view (list of all markers valid for current application states set). |
| 26 | User defined markers visualization. See [MU]. |

| 42 | Multithread variable access visualization. This tool provides information about type of operations (read, write) and their frequency based on a source thread. |
| 43 | Callstack recovery. Each application state has full information about its managed callstack. |
| 44 | Application state comparer. This tool compares two different historical runs of an application and shows differences between them. |
| 45 | TMQL Batch. External application, run separately from Microsoft Visual Studio, allowing analysis of the recorded application states using TMQL. |
| 46 | Historical run data sharing. Allows simultaneous work of multiple users on the same set of application states. |

FIG. 18D

SOFTWARE CODE DEBUGGER FOR QUICK DETECTION OF ERROR ROOT CAUSES

CROSS REFERENCE TO RELATED APPLICATION

This application claims the benefit of U.S. Provisional Application No. 62/304,598, filed Mar. 7, 2016, and titled. "SOFTWARE CODE DEBUGGER FOR QUICK DETECTION OF ERROR ROOT CAUSES," the disclosure of which is incorporated herein by reference in its entirety and for all purposes.

TECHNICAL FIELD

The subject matter disclosed herein generally relates to processing data. In some example embodiments, the present disclosures relate to methods for recording runtime states of an executed program compiled from source code in a software code debugger.

BACKGROUND

Debugging software is an essential practice for developing computer programs. Whole academic classes, books, software development teams, and software organizational structures have been dedicated to increasing the ease at which software errors can be found and easily rectified. The costs to developing software are in part measured by how few errors are generated, and how quickly errors can be found. Multiple tools have been created to aide developers in increasing their ability and reducing their time in debugging software. This becomes exponentially more important as programs become more complex. In general, it is continually a desire to improve ways of debugging software.

BRIEF SUMMARY

Aspects of the present disclosure are presented for a software code debugger tool. In some embodiments, the code debugger tool may be configured to access source code intended to be examined for debugging. The debugger tool may compile the source code using a specially designed compiler that incorporates state recording functionality and other debugging functionality directly into the source code. Then, when the source code is executed, such as to run an application, the debugging tool may be configured to record a plurality of states that the application progresses through upon executing the application. In some embodiments, a user interface and display component of the debugger tool may allow for the user to step through the plurality of states—going forward, backward, or jumping around—so as to examine how the application was executed and what exact portions of the source code correspond to each recorded state. In some embodiments, various visual indicators may also provide additional annotations to aid in debugging, such as displaying the content of variables in a visual annotation showing their history of values, providing an in-line marker to indicate which line of code is being executed at the current examined state, and providing a temporal status indicator to provide context to the user about what the present state represents in relation to specific functions in the source code.

In some embodiments, a computer implemented method is presented. The method may provide software debugging functionality to a target source code. The method may include: accessing, by a processor configured to provide the software debugging functionality, the target source code, the target source code written in a high level computer program language; compiling, by the processor, the target source code; the compiling including: injecting debugging functionality source code into the target source code that is interspersed between a plurality of statements of the target source code; and converting the debugging functionality source code and the target source code into a low level computer program language; executing the converted target source code; recording a plurality of logical states of the converted target source code using the converted debugging functionality source code; and displaying the recorded states in an application interface readable to a human user.

BRIEF DESCRIPTION OF THE DRAWINGS

Some embodiments are illustrated by way of example and not limitation in the figures of the accompanying drawings.

FIGS. 3-1, 3-2 and 3-3 show an example programming environment for developing and debugging source code with the aid of the debugging tool of the present disclosures, according to some embodiments.

FIGS. 4-1 and 4-2 include additional functionality provided by the debugger tool, according to some embodiments.

FIGS. 6A-1 through 6E show an example of the programming environment and examples of various features utilizing the software debugger tool, according to some embodiments.

FIGS. 6A-1, 6-2 and 6A-3 show an example of the programming environment after the source code has been compiled and executed, including various display windows provided by the software debugger tool, according to some embodiments.

FIG. 6E shows a display of State 10 out of 28 (reference 682), providing an example display of reading in an input from the user when executing the program, according to some embodiments.

FIG. 7 provides another example display view for providing additional information, according to some embodiments.

FIGS. 8A-8B show various views of example source code used to demonstrate features of the software debugger tool, according to some embodiments.

FIG. 8A shows a clean view of the example source code used in these various examples.

FIG. 8B shows an example of the same source code but with various example annotations provided by the software code debugger of the present disclosures.

FIG. 9 shows a display with additional example features of the software code debugger, according to some embodiments.

FIGS. 10-1 and 10-2 show a more complex example of the software debugger tool, in this case allowing for debugging of a multithreaded application, according to some embodiments.

FIGS. 11A1 and 11A-2 through 11B show example outputs of a multithreaded source code application as described in FIGS. 10-1 and 10-2.

FIGS. 11A-1 and 11A-2 provide an example output of the various recorded states after compiling and executing the multithreaded source code application in FIGS. 10-1 and 10-2.

FIG. 11B provides a more detailed view in the thread view of the operations occurring within each thread and at what points in time they occurred.

FIGS. 12-1 and 12-2 provide a superimposed view of the thread view with the corresponding source code.

Figure 18C:
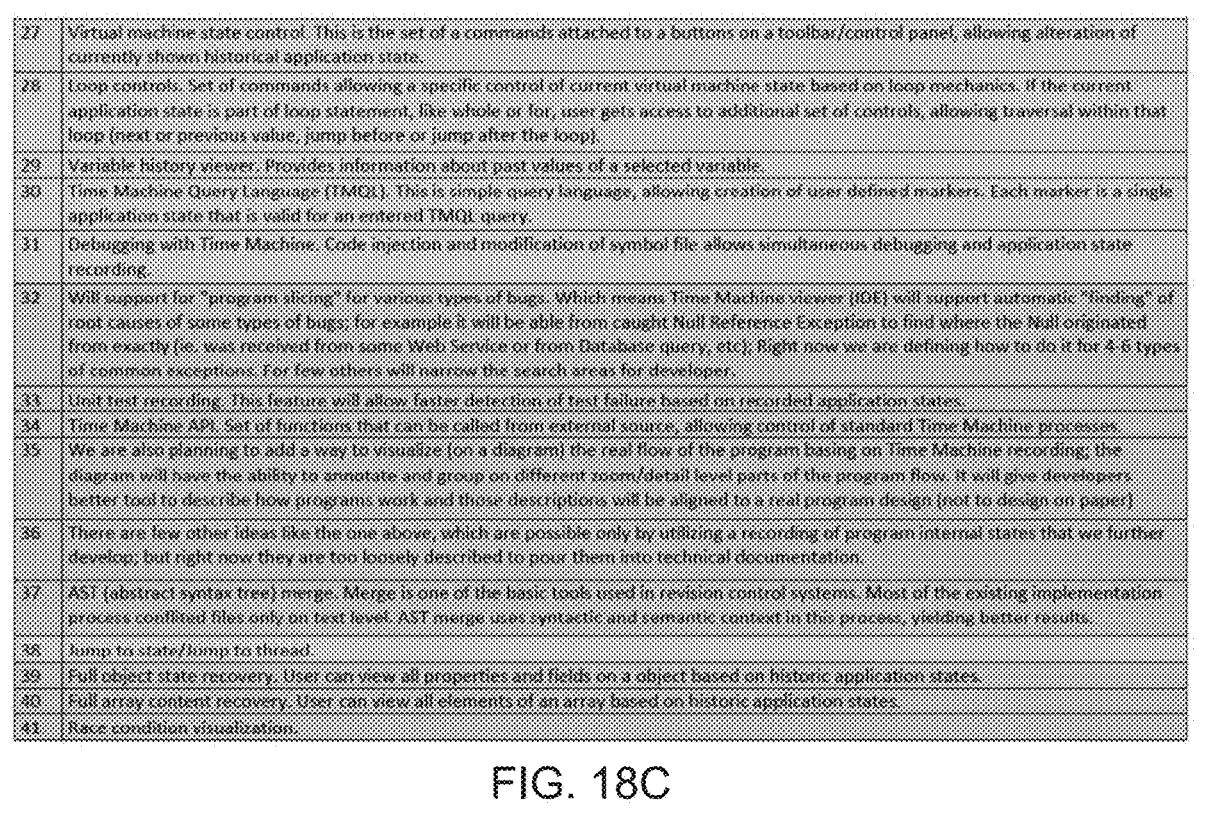

FIGS. 18A-18D show charts providing a non-exhaustive summary list of various features that are believed to be novel and inventive of at least some aspects of the software code debugger, according to some embodiments.

DETAILED DESCRIPTION

Figure 1:
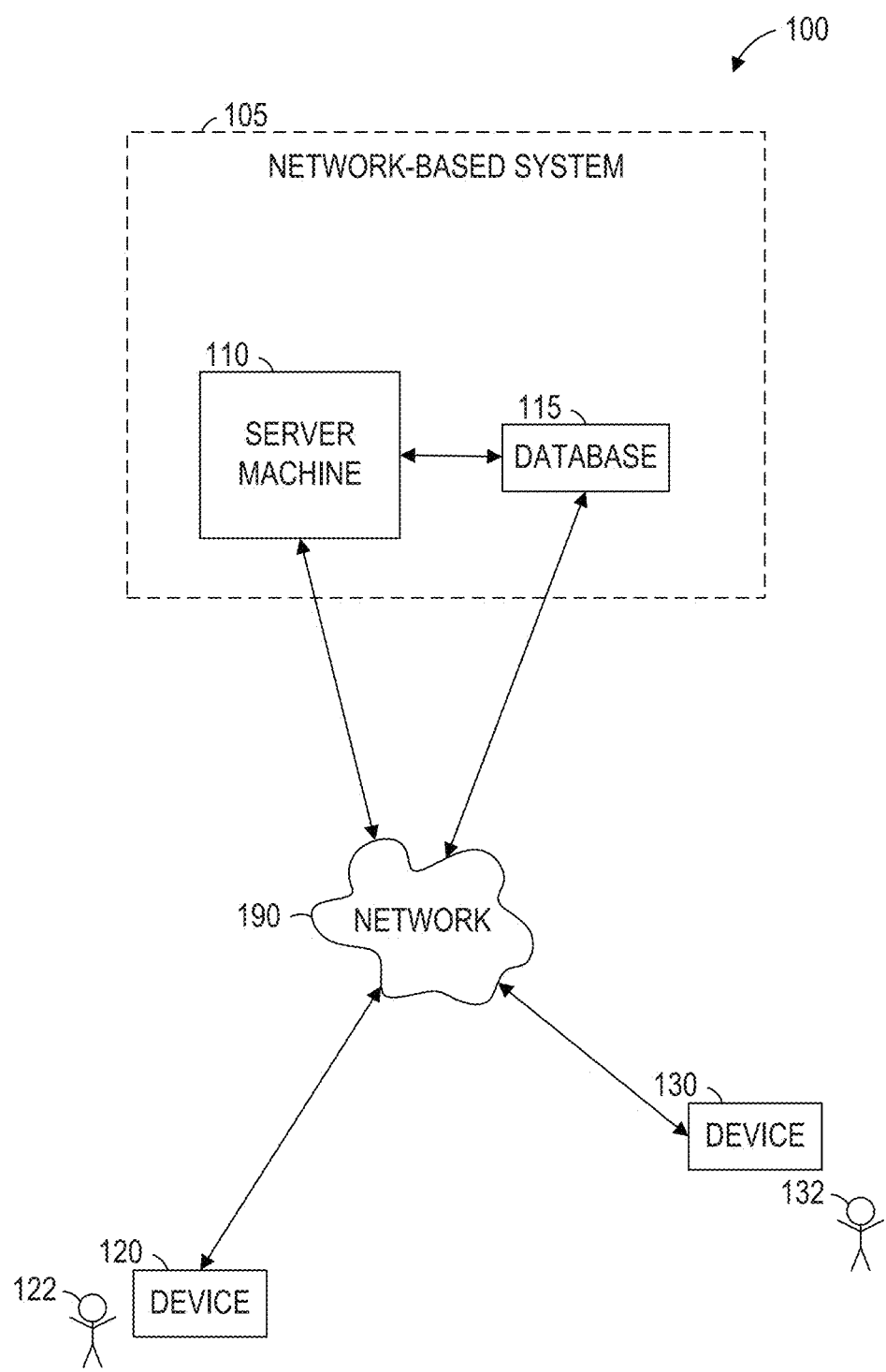
FIG. 1 is a network diagram illustrating an example network environment suitable for aspects of the present disclosure, according to some example embodiments.

Example methods, apparatuses, and systems (e.g., machines) are presented for a software code debugger tool. In some embodiments, the code debugger tool may be configured to access source code intended to be examined for debugging. The debugger tool may compile the source code using a specially designed compiler that incorporates state recording functionality and other debugging functionality directly into the source code. Then, when the source code is executed, such as to run an application, the debugging tool may be configured to record a plurality of states that the application progresses through upon executing the application. A user interface and display component of the debugger tool may allow for the user to step through the plurality of states—going forward, backward, or jumping around—so as to examine how the application was executed and what exact portions of the source code correspond to each recorded state. Various visual indicators may also provide additional annotations to aid in debugging, such as displaying the content of variables in a visual annotation showing their history of values, providing an in-line marker to indicate which line of code is being executed at the current examined state, and providing a temporal status indicator to provide context to the user about what the present state represents in relation to specific functions in the source code.

Conventionally, many commercially available reverse debuggers do not perform a separate compilation phase, e.g., a different than normal compilation of the target program separate from the debugger program to run without recording facilities turned on. The recording then is done solely at runtime by either hooking up into a Virtual Machine (VM), for languages run under one, or directly into CPU and/or operating system facilities (most likely designed by the CPU/OS vendor for profiling). Those hooking into a VM act as an intermediary between a reader of virtual machine code that the application consists of and a virtual machine compiler/interpreter that produces host CPU instructions to execute (e.g., it might be a Just In Time compiler). On the other hand, those hooking into CPU system facilities add traps that are executed in a given interval or when defined execution events happen (e.g., executed instruction pointed changed, cache page miss, etc.). Most of these facilities were not designed to record, and using them disables at least some of the optimizations used by those virtual machines/platforms.

Using conventional runtime methods means that they also analyze and possibly record events and executed code that is outside of reach for a software developer and don't even relate to the source code of running application, e.g., a standard library of chosen language/platform, system calls of underlying operating system, etc. The recorder would not only have to record values, it would have to determine what the values really are and what types of event occurred, assuming it does relate to the target application at all. These ad hoc solutions are costly and their operation would be extremely slow.

Additionally, relating the recorded events to source code of an application does require complex algorithms. For languages with optimizing compilers, such matching of recorded events with source code is very difficult and non-trivial, and in some instances not possible at all (e.g., loops can be unrolled, variables in-lined or even eradicated completely if not used, etc.). In those cases, a software developer would not get a recording for every instruction written into the program.

As for any programs developed through research, these research-quality works have not been successful, leaving software developer with a view of the recording with and for only executed machine-code (like geoHot's fame timeless debugger).

In contrast, aspects of the present disclosure are presented for a way to make debugging faster by embedding the recording functionality right into the very source code of the instrumented application at the very moment before the proper compilation phase. In this way, the weight of analyzing what is being executed and how to record the given event/value step from runtime to compile-time has been moved, increasing the speed at run-time. In some embodiments, the described debugger of the present disclosure does not analyze or record anything that does not relate directly to source code, meaning there is no time wasted on non-useful elements. Furthermore, in some embodiments, aspects of the present disclosure allow the debugger to take advantage of the compiler's and virtual machine optimization techniques, since the code is interjected directly into the source code before the optimization phases of the compiler.

Other features of the present debugger include making it straight forward to match recording values/events to source code, as a unique identifier of source code position is embedded at compile time into each recording statement. Additionally, it works also when the code is transformed after compilation, according to some embodiments, i.e., the debugging code is obfuscated or instrumented with the use of Aspect Oriented Programming post processor, etc. Still, recording will work as expected and it will produce values that can be located for each source code statement and with zero noise introduced in the recording by the use of such post-compilation transformation tools.

In addition, static analysis of the source code allows the debugger to make predictions, compounding recording of multiple values and upfront postpone their recording to a single place basing of their actual use within a program. The decision on how and when to record a particular value or event is done at compile time.

As yet another feature, the debugger of the present disclosure is not tied to particular Virtual Machines (like .NET runtimes), platforms or architectures. It makes it possible to run instrumented application under different runtimes/platforms that do not necessary have a particular virtual machine available or even do not have it at all as the output application can be transpiled (i.e., translated/converted) with the use of other tools to run as a program on a different platform or even as a standalone application. For example, games written in .NET and using Unity 3D game engine can run without the use of Microsoft .NET runtime on variety of different CPUs and platforms like Android, iOS, Wii, PS3, etc.

Referring to FIG. 1, a network diagram illustrating an example network environment 100 suitable for performing aspects of the present disclosure is shown, according to some example embodiments. The example network environment 100 includes a server machine 110, a database 115, a first device 120 for a first user 122, and a second device 130 for a second user 132, all communicatively coupled to each other via a network 190. The server machine 110 may form all or part of a network-based system 105 (e.g., a cloud-based server system configured to provide one or more services to the first and second devices 120 and 130). The server machine 110, the first device 120, and the second device 130 may each be implemented in a computer system, in whole or in part, as described below with respect to FIG. 19. The network-based system 105 may be an example of a software debugging system configured to perform the software debugging disclosures as described herein. The server machine 110 and the database 115 may be components of the software debugging system configured to perform these functions. While the server machine 110 is represented as just a single machine and the database 115 where is represented as just a single database, in some embodiments, multiple server machines and multiple databases communicatively coupled in parallel or in serial may be utilized, and embodiments are not so limited.

Also shown in FIG. 1 are a first user 122 and a second user 132. One or both of the first and second users 122 and 132 may be a human user, a machine user (e.g., a computer configured by a software program to interact with the first device 120), or any suitable combination thereof (e.g., a human assisted by a machine or a machine supervised by a human). The first user 122 may be associated with the first device 120 and may be a user of the first device 120. For example, the first device 120 may be a desktop computer, a vehicle computer, a tablet computer, a navigational device, a portable media device, a smartphone, or a wearable device (e.g., a smart watch or smart glasses) belonging to the first user 122. Likewise, the second user 132 may be associated with the second device 130. As an example, the second device 130 may be a desktop computer, a vehicle computer, a tablet computer, a navigational device, a portable media device, a smartphone, or a wearable device (e.g., a smart watch or smart glasses) belonging to the second user 132. The first user 122 and a second user 132 may be examples of users or programmers interfacing with the network-based system 105 to develop their programs through their source code and debug them according to their specific needs. The users 122 and 132 may interface with the network-based system 105 through the devices 120 and 130, respectively.

Any of the machines, databases 115, or first or second devices 120 or 130 shown in FIG. 1 may be implemented in a general-purpose computer modified (e.g., configured or programmed) by software (e.g., one or more software modules) to be a special-purpose computer to perform one or more of the functions described herein for that machine, database 115, or first or second device 120 or 130. For example, a computer system able to implement any one or more of the methodologies described herein is discussed below with respect to FIG. 19. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
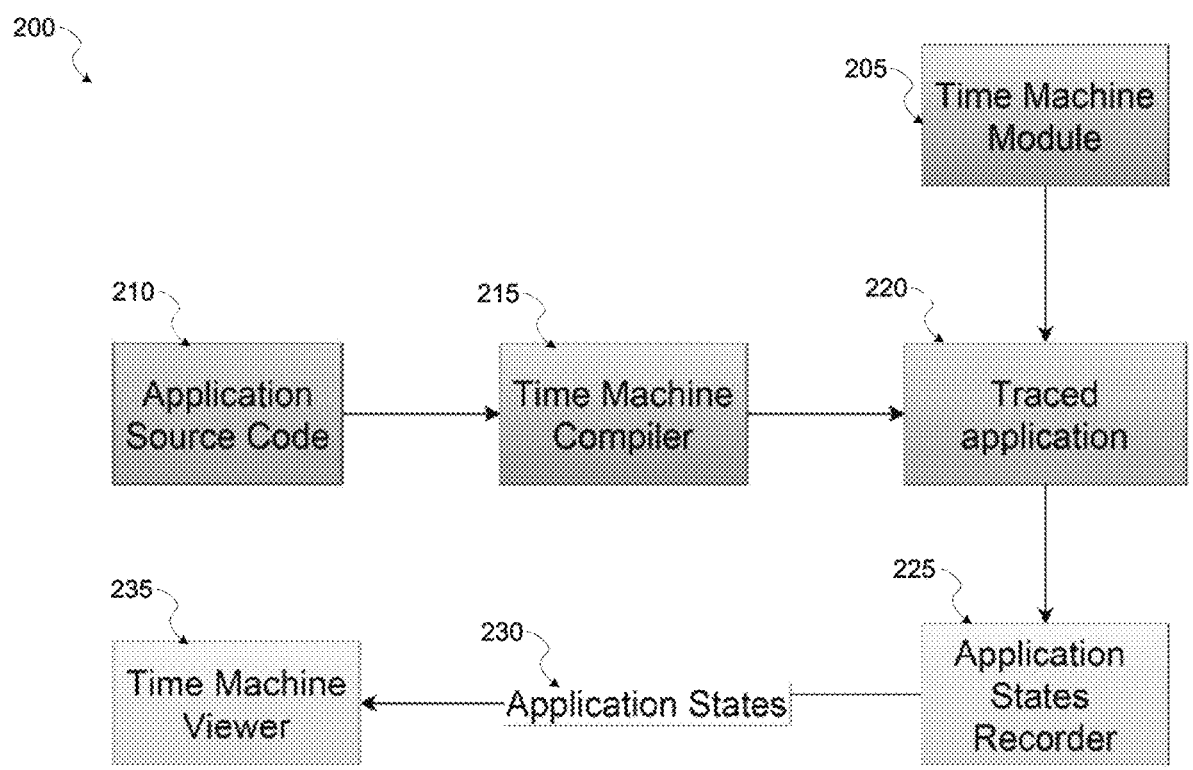
FIG. 2 shows a block diagram of one example of the software debugger tool and how it may interact with application source code, according to some embodiments.

Referring to FIG. 2, illustration 200 shows a block diagram of one example of the software debugger tool and how it may interact with application source code, according to some embodiments. In this example, the software debugger tool includes a RevDeBug (RDB) module 205 and an RDB compiler 215. The RDB module 205 may be configured to record the states of an application (computer program) and provide visual aids in a user interface that annotates application source code compiled through the RDB compiler 215. In this example, the application source code 210 represents the original source code that is to be traced and examined for debugging by the debugging tool of the present disclosures. In some embodiments, the RDB Compiler 215 processes the application source code 210 and builds a modified output file, with injected additional instrumentation code. Each instrumentation code is assigned a Statement Identifier. Information about the injected code and about application's internal structures are saved into an RDB Statements (RDBSX) file, according to some embodiments.

The RDB Module 205 provides additional instrumentation commands, that are called while a traced application 220 is run. The traced application 220 is the result of the application source code 210 being compiled by the RDB compiler 215. That is, the traced application 220 includes the application source code 210 and additional instrumentation code that allows the application source code 210 to be traced. The RDB module 205 is referenced while the traced application is built and is therefore deployed with the RDB compiler 215. In some embodiments, each instrumentation command requires the Statement Identifier that is assigned by the RDB Compiler 215.

In some embodiments, the traced application 220 can be run in the same environment as original application, coupled with access to the RDB Module 205. Every operation or action that is executed by the traced application 220 triggers instrumentation code that creates an object, describing a new application state. Based on the provided configuration, the RDB Module 205 will send those application states to a defined Application States Recorder 225.

In some embodiments, the Application States Recorder 225 is a separate module or application that provides means of saving application states 230 that are generated while the traced application is running. Received data may be saved into a binary file, database or any other storing interface. The data gathering process can be turned on or off on the fly (without resetting traced application) by the Application States Recorder 225, according to some embodiments. Application States Recorder 225 also can be accessed by RDB Module 205 via means of network 190 access.

The RDB Viewer 235 provides extensions for IDE, that provides visual representations of the historical run of the traced application 220. It can be done by loading and processing RDB Statements and recorded Application States 230. Available tools include a graphical representation of the application's threads, step-by-step visualization based on the original source code 210 and a current-step view of variables and executed operations. The RDB Viewer 235 also provides interface for RDB Query Language (QL), which allows for finding applications states that meet supplied conditions.

Example Use Cases

Figures 1, 3:
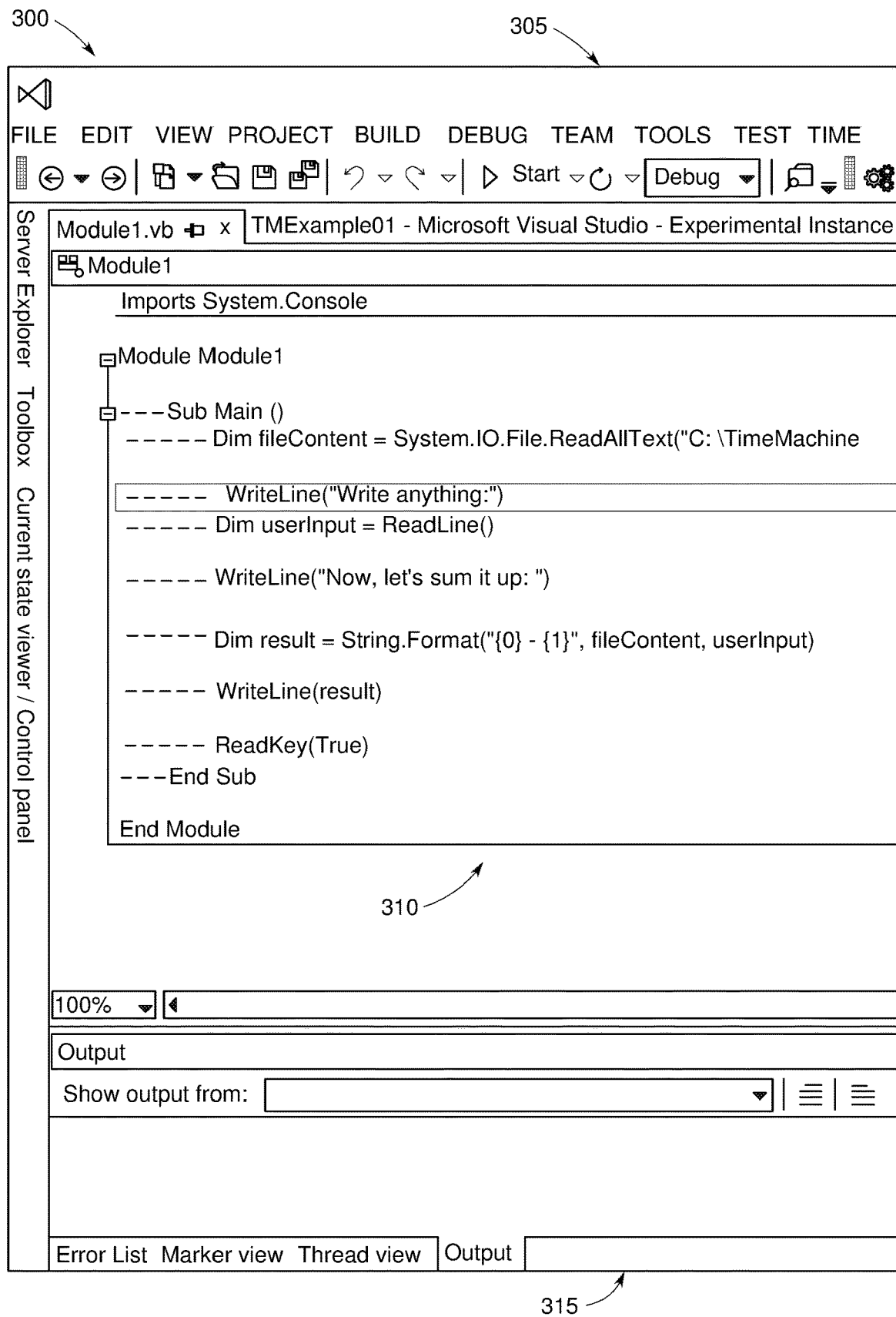
Figures 2, 3:
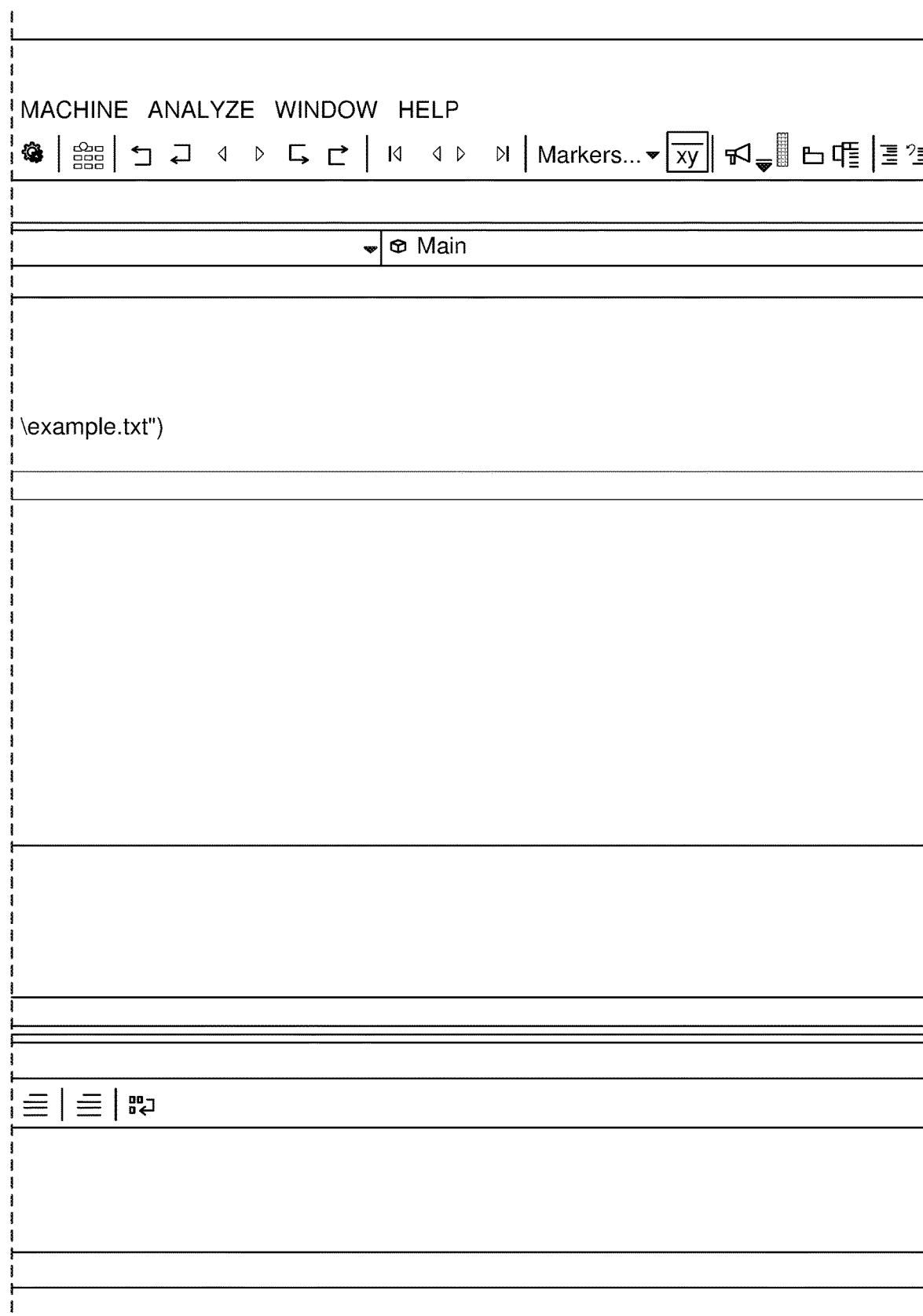
Figure 3:
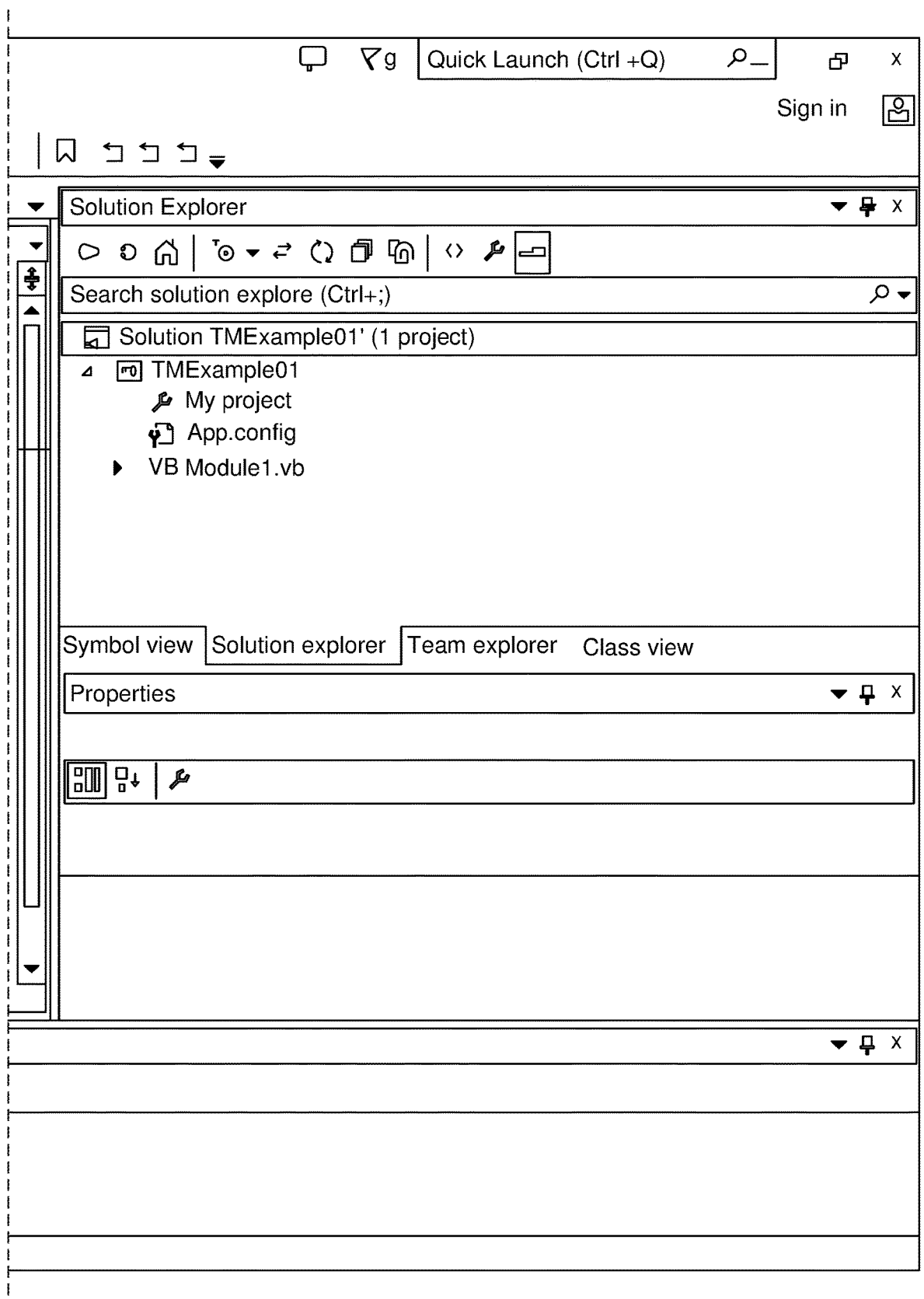

Referring to FIGS. 3-1 and 3-3, illustration 300 shows an example programming environment for developing and debugging source code with the aid of the debugging tool of the present disclosures, according to some embodiments. In this example, a simple program comprising lines of source code 310 is being displayed in Microsoft Visual Studio environment 305. As some examples, the environment 305 includes a number of submenus at the top ribbon, various icons used for tracing through the source code 310, and an output window 315 that shows what outputs are being generated while the program of the source code 210 is run. In general, most of the environment 305 represents an example of a typical programming environment found in a number of conventional programming environments.

Figures 2, 4:
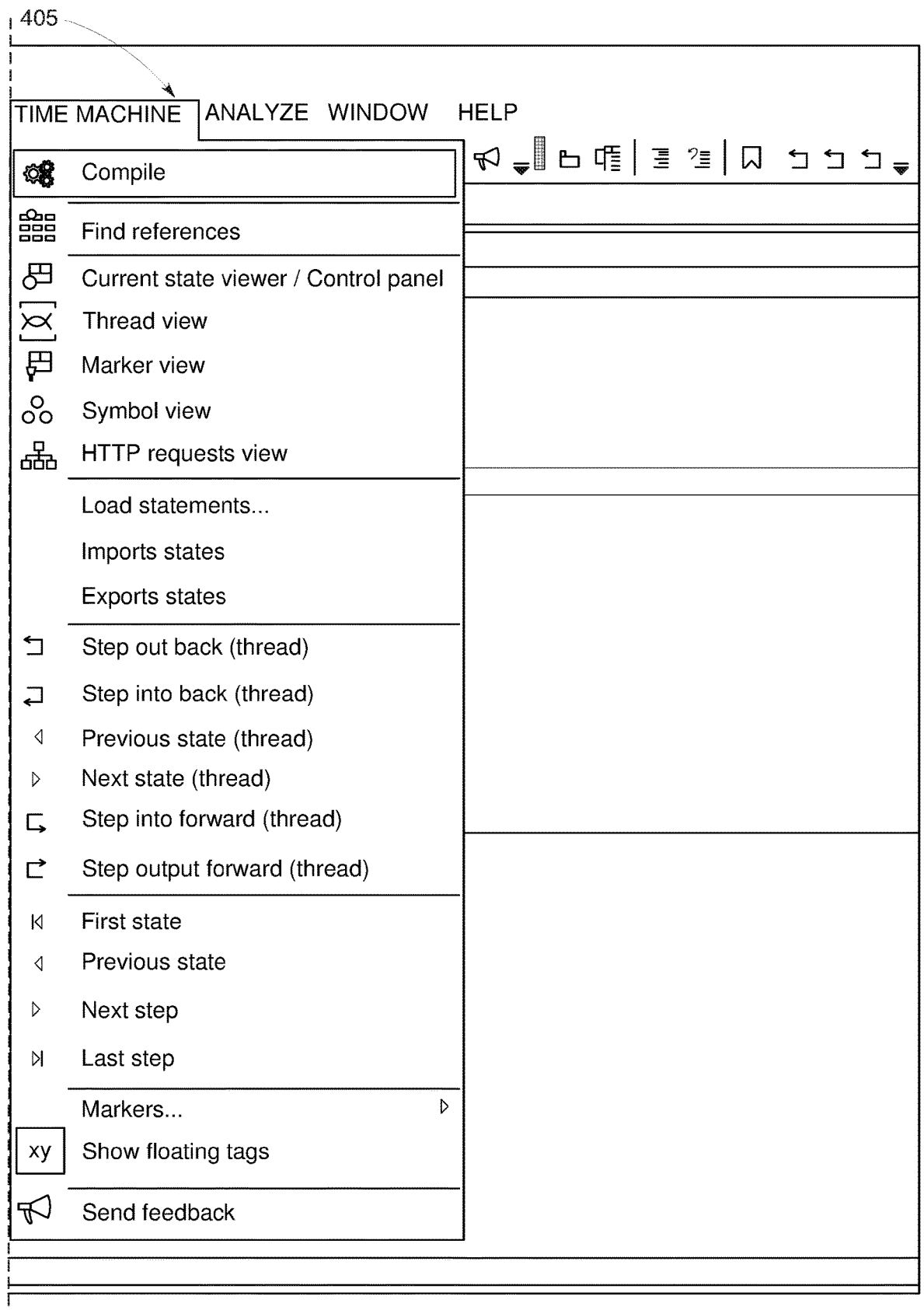

Referring to FIGS. 4-1 and 4-2, illustration 400 includes additional functionality provided by the debugger tool, according to some embodiments. Here, for example, a new submenu 405 called "Time Machine," is embedded as one of the submenus integrated into the Microsoft Visual Studio programming environment. The various items in the submenu 405 represent different functions that portions of the software debugger tool of the present disclosures may be configured to perform, according to some embodiments. For example, the "Compile" function at the top line of the submenu 405 allows the present source code 410 to be compiled using the software debugger tool of the present disclosures (see also RDB Compiler 215 in FIG. 2). The software debugger tool may also be integrated into other parts of the normal programming environment, such that when the compiler of the software debugger tool, pressing the normal start button 415 causes the programming environments to run a modified version of the source code that more effectively enables the user to a debug his or her program.

Figure 5:
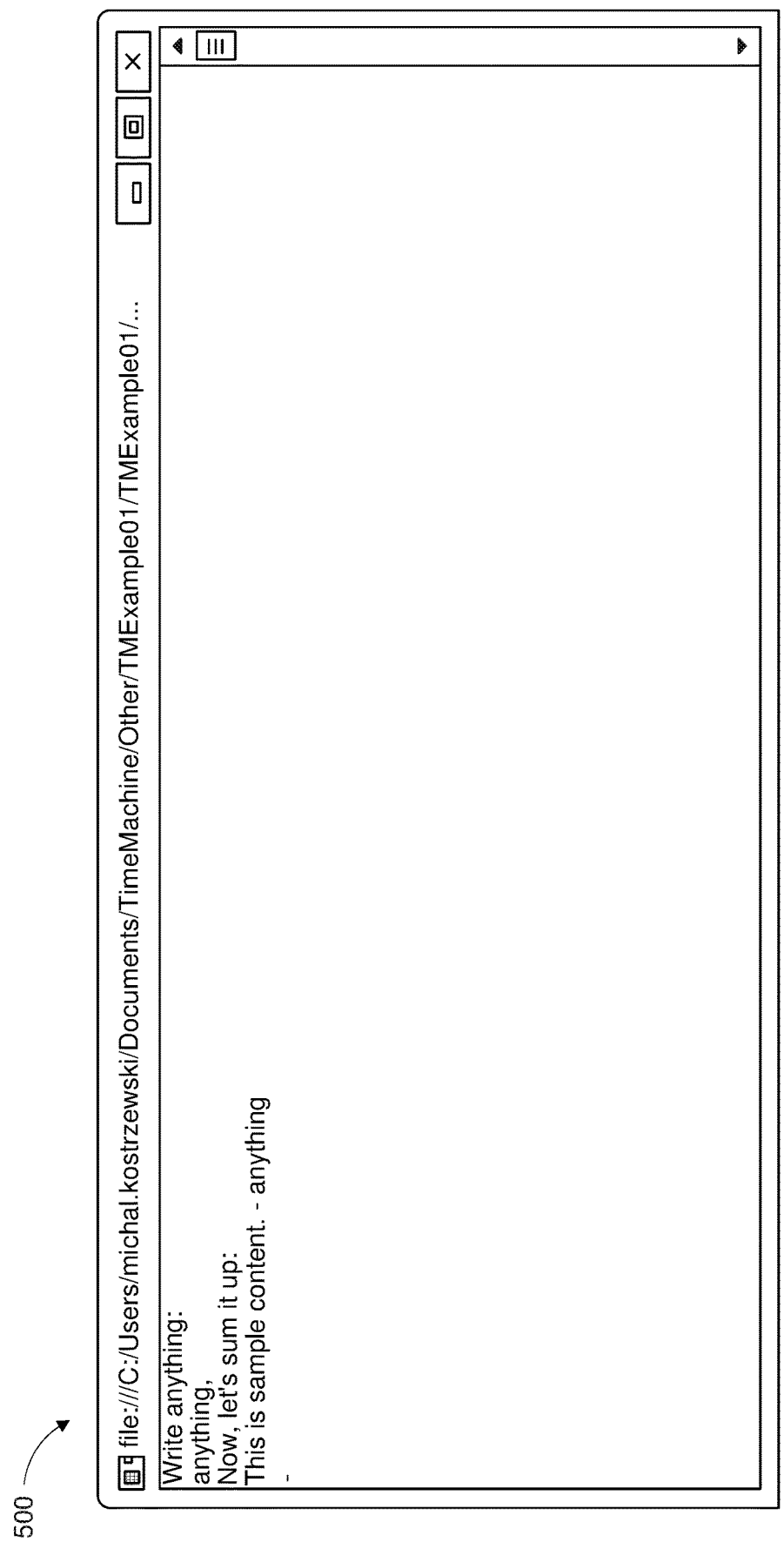
FIG. 5 shows a text window that is running the executed program of the source code shown in FIGS. 3 and 4, for reference.

Referring to FIG. 5, illustration 500 shows a text window that is running the executed program of the source code shown in FIGS. 3 and 4, for this reader's reference. The text window shows the displayed prompts outputted by the program, as well as an example input supplied by a user; which here is the text "anything." This input is then stored by the program and outputted again in the last line, as shown.

Figures 1, 6A:
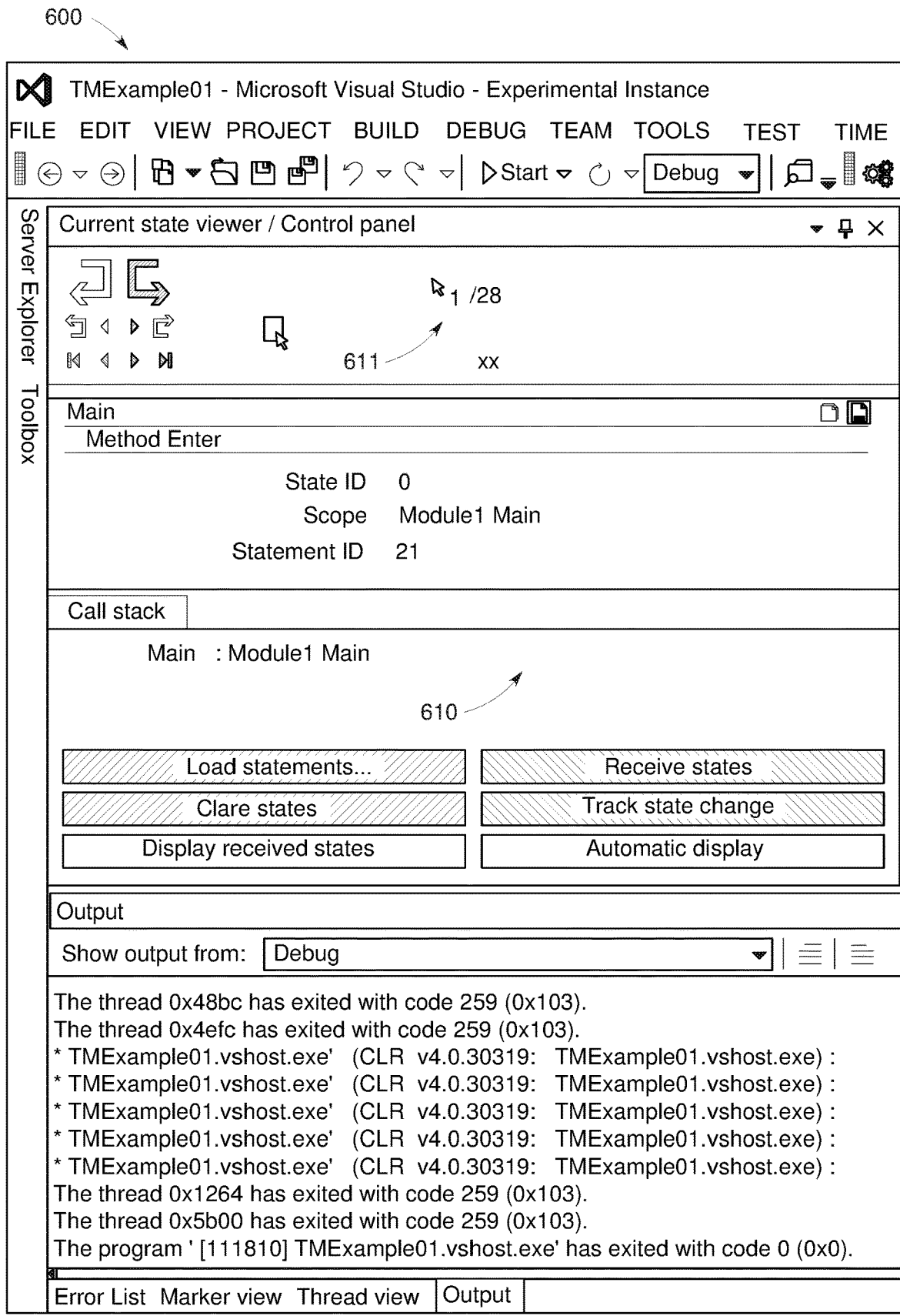
Figures 2, 6A:
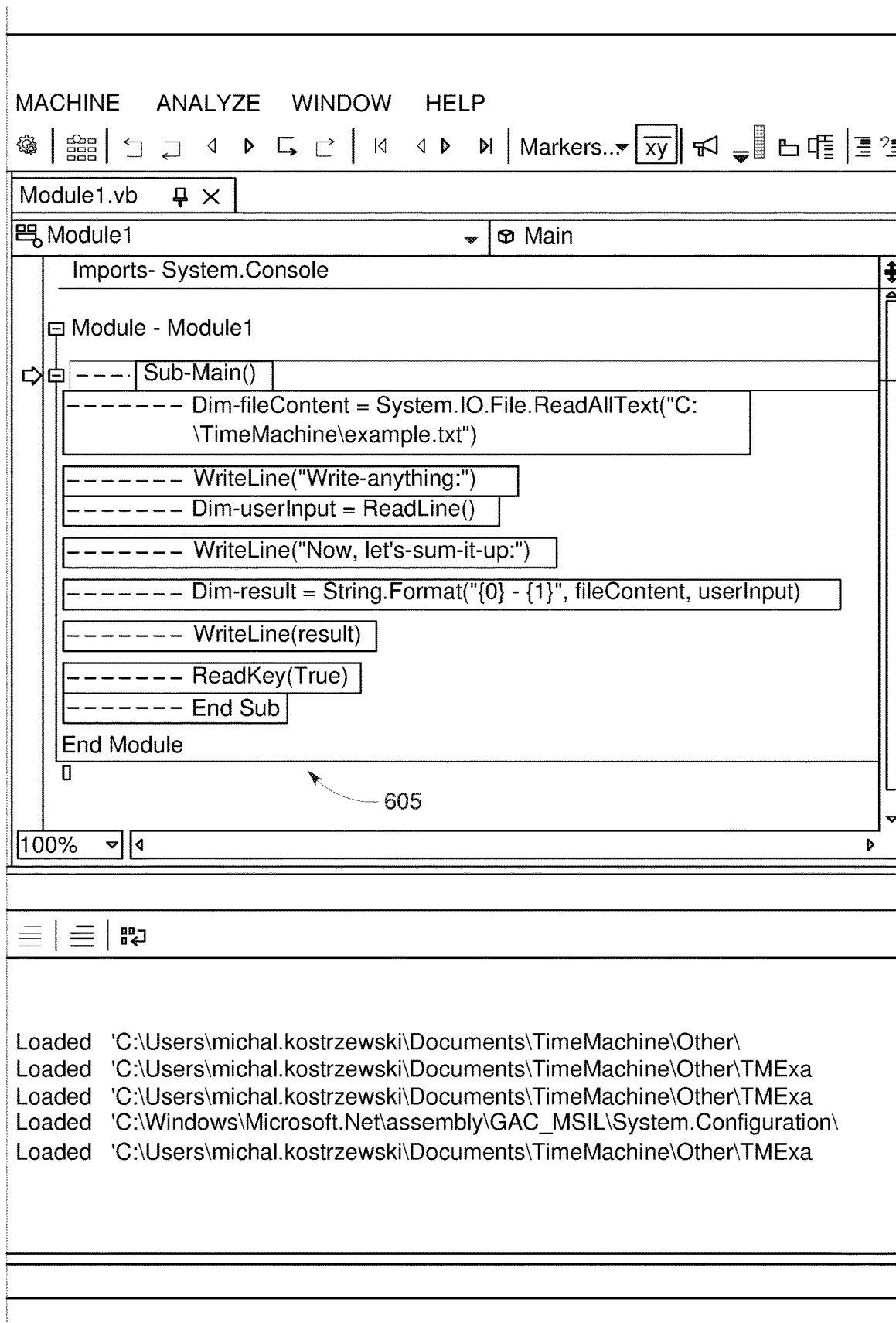
Figures 3, 6A:
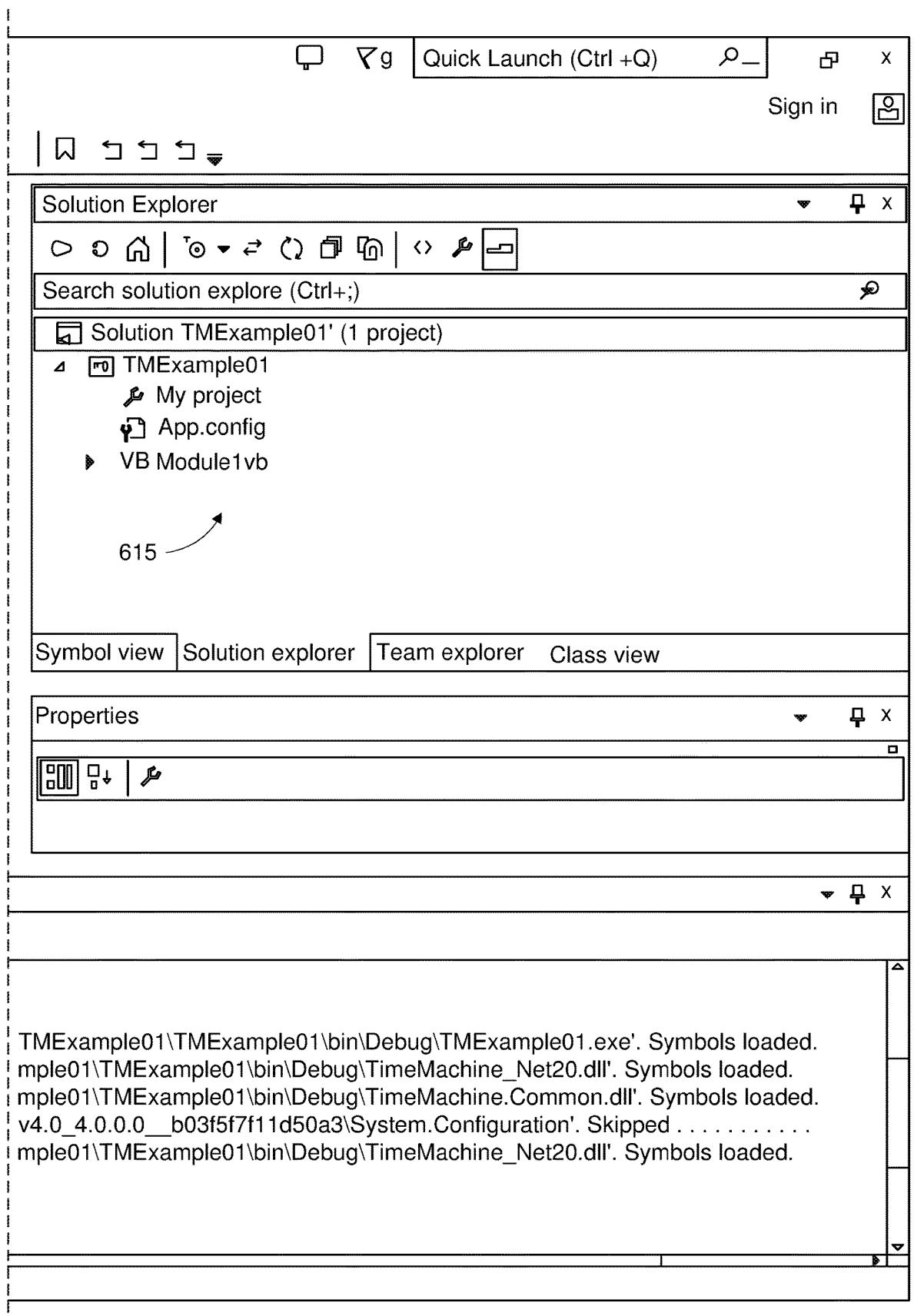

Referring to FIGS. 6A-1 and 6A-3, illustration 600 shows an example of the programming environment after the source code has been compiled and executed, including various display windows provided by the software debugger tool, according to some embodiments. Here, the middle windowpane shows the lines of the source code 605 with some additional annotations and highlights provided by aspects of the software debugger tool. To the left, a current state viewer panel 610 is a new display provided by the software debugger tool and provides various information about a current recorded state of the executed program, that is under examination. Here, reference 611 shows that the current state of the program being examined is state 1, out of 28 total recorded states. It is worth noting that while there are 28 recorded states, there are fewer than 28 lines of source code shown in the code 605. To the right, a solution Explorer window 615 is another new display provided by the software debugger tool and provides other information about various outputs of the executed program.

Figure 6B:
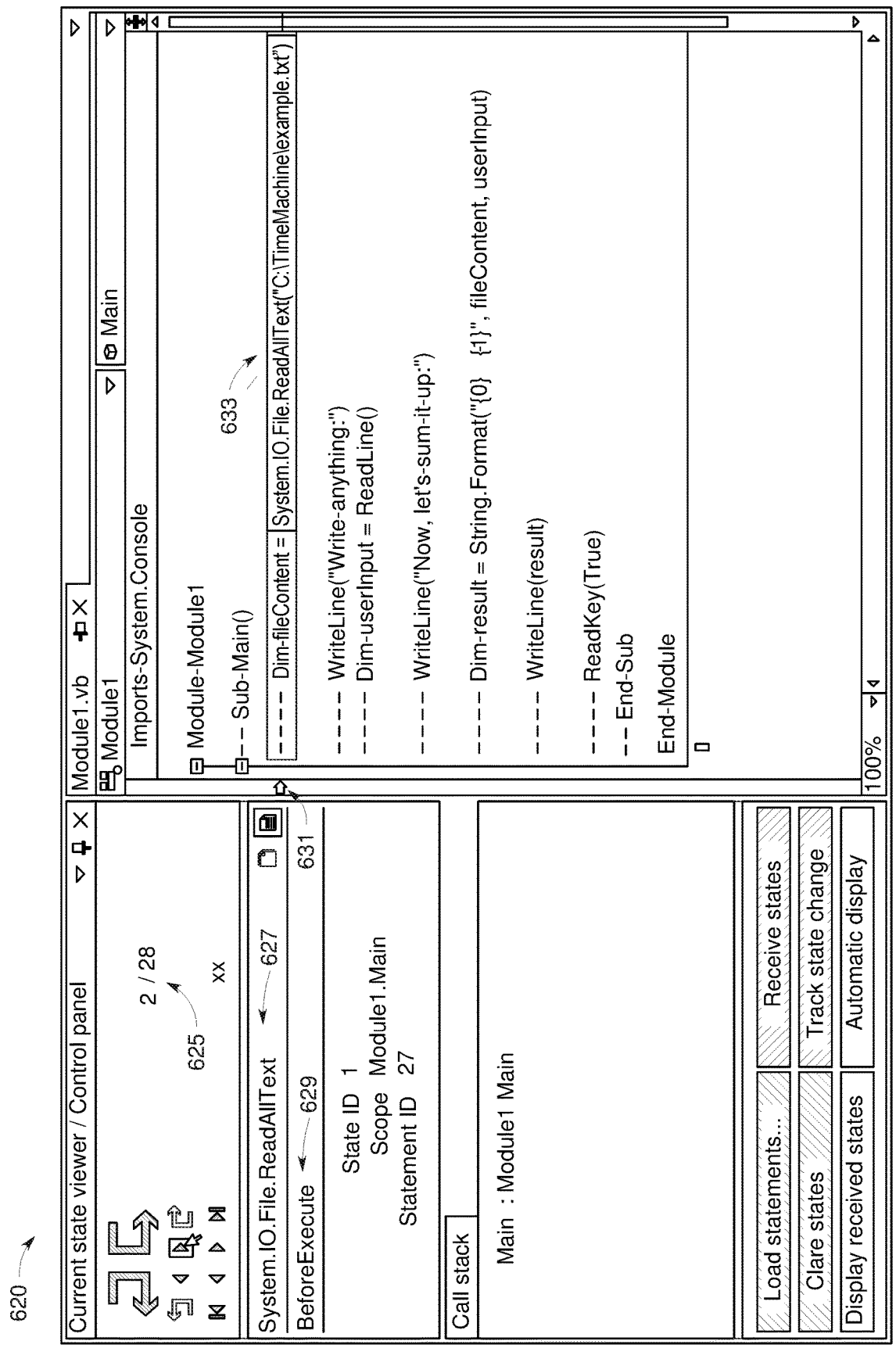
FIG. 6B shows a display of the next recorded state and the various displays and annotations that the software debugger tool may provide to the user, according to some embodiments.

Referring to FIG. 6B, illustration 620 shows a display of the next recorded state and the various displays and annotations that the software debugger tool may provide to the user, according to some embodiments. That is, the user may click an arrow button to the right in the top left area to progress to the next state, state 2 out of 28 as shown at reference 625. Here, the control state viewer of the left panel provides information about the second state. For example, reference 627 shows what is the object or function that is being executed in the second state. Here that function is "System.IO.File.ReadAllText." In addition, reference 629 shows the context of what State 2 is in relation to the executed function. Here, this shows that State 2 represents "BeforeExecute" of the function "System.IO.File.ReadAllText." In addition, an in-line indicator 631 shows what line of source code is being executed at State 2. Furthermore, the software debugger tool of the present disclosure may also include highlighting 633 of the specific portions of this line of code to more precisely show what the program is executing at State 2.

Figure 6C:
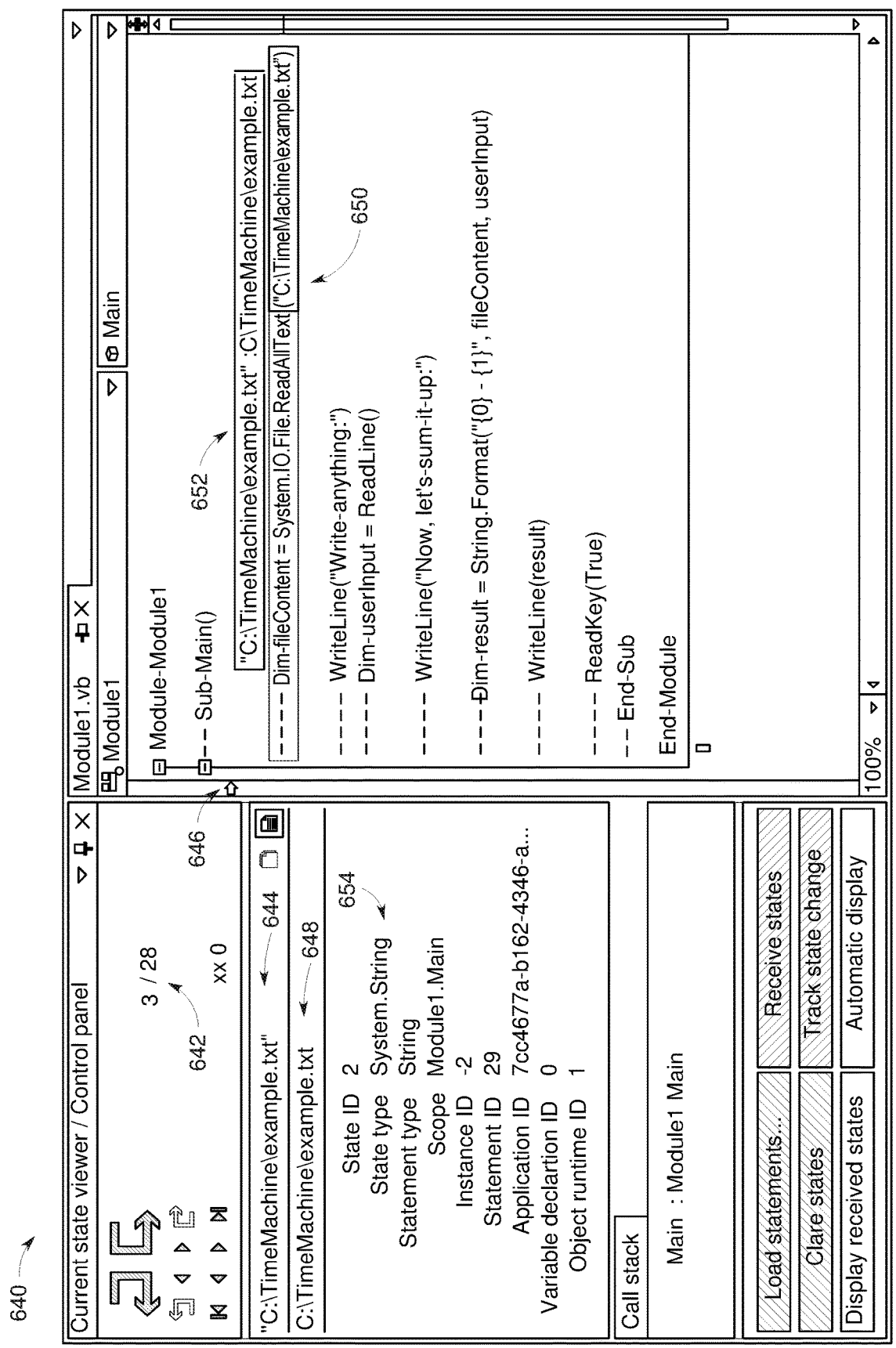
FIG. 6C shows a display of the next recorded state (State 3) and the various displays and annotations that the software debugger tool may provide to the user, according to some embodiments.

Referring to FIG. 6C, illustration 640 shows a display of the next recorded state (State 3) and the various displays and annotations that the software debugger tool may provide to the user, according to some embodiments. Similar to illustration 620, reference 642 shows that the current state being examined is State 3 out of 28. Here, reference 644 shows what is the object or function that is being executed in this third state. Here, that object is "C:\TimeMachine\example.txt," which is a text file located at the source destination provided. Reference 648 shows the context of what State 3 is in relation to a function or other portion of code. The current state viewer panel also may provide additional register information 654.

The in-line indicator 646 shows that the line of code still being executed is the same line shown in State 2 of 28 (see FIG. 6B). However, the highlighted portion 650 indicates that only a smaller portion of the code at this line is the subject of State 3, namely just "C:\TimeMachine\example.txt." In addition, in some embodiments, the software debugger tool may provide an annotation 652 that shows the value of a variable or register. This feature may allow a developer to see instantly what variables or registers are being populated with.

Figure 6D:
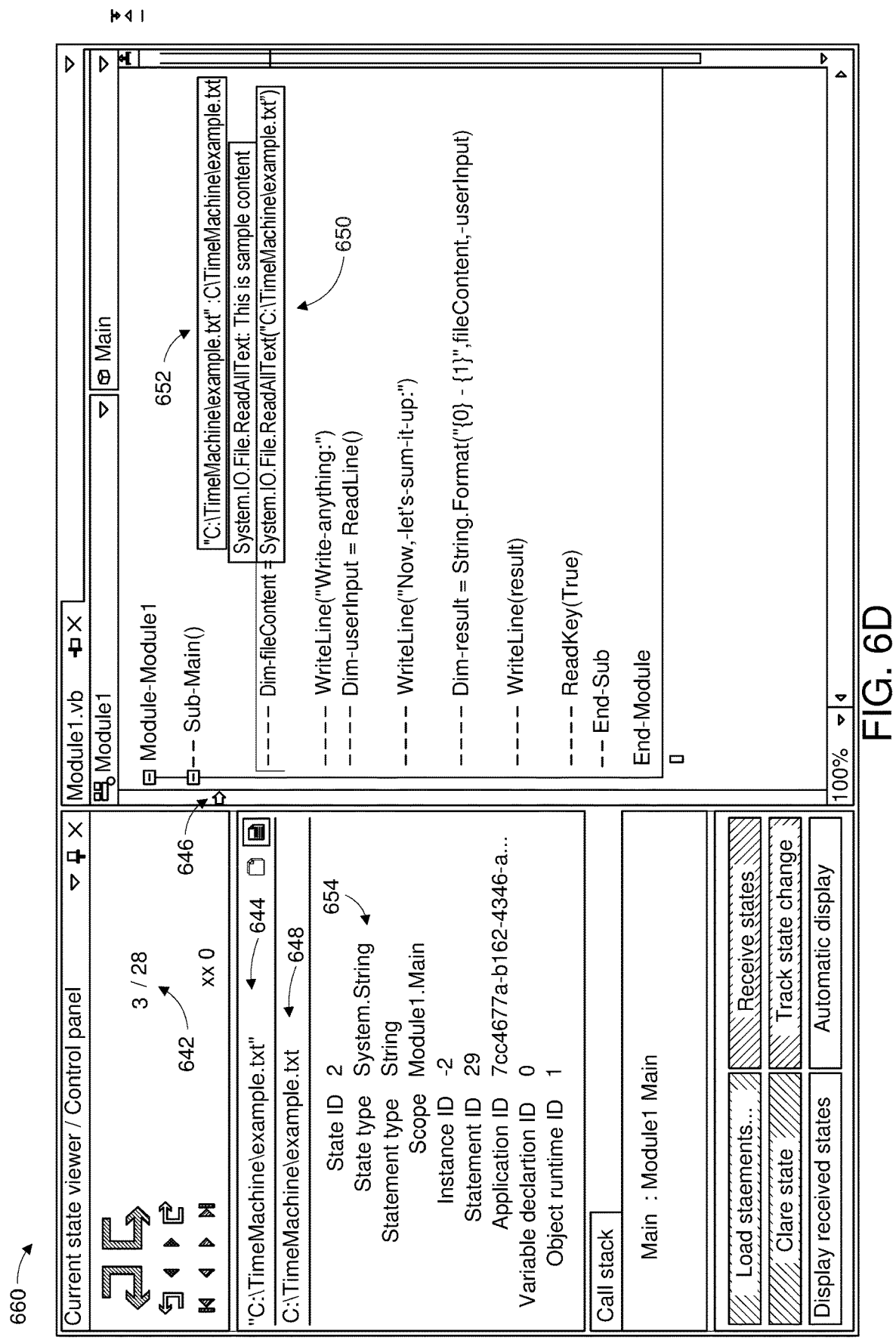
FIG. 6D shows a display of the next recorded state (State 4) and the various displays and annotations that the software debugger tool may provide to the user, according to some embodiments.

Referring to FIG. 6D, illustration 660 shows a display of the next recorded state (State 4) and the various displays and annotations that the software debugger tool may provide to the user, according to some embodiments. Similar to illustrations 620 and 640, reference 662 shows that the current state being examined is State 4 out of 28. Reference 664 shows what is the object or function that is being executed in this fourth state. Reference 668 again provides context or other types of characterization of what State 4 represents. In this case, the current state viewer provides the description that State 4: "This is simple content." The current state viewer panel also may provide additional register information about State 4.

The in-line indicator 666 shows that the line of code still being executed at the same line for States 2 and 3 (see FIGS. 6B, 6C). However, again, the highlighted portion 670 has changed to cover a larger portion of the line at reference 666. In addition, the software debugger tool may provide annotations 672 that show the value of a variable or register of the highlighted portion.

When viewing these various first for states in sequence, and may be apparent how a developer or other user may be able to trace the progression of code execution of the instant source code through the software code debugger of the present disclosures. The developer or other user may view the code progression in a sort of time-lapse to see how the program is run in sequence.

Figure 6E:
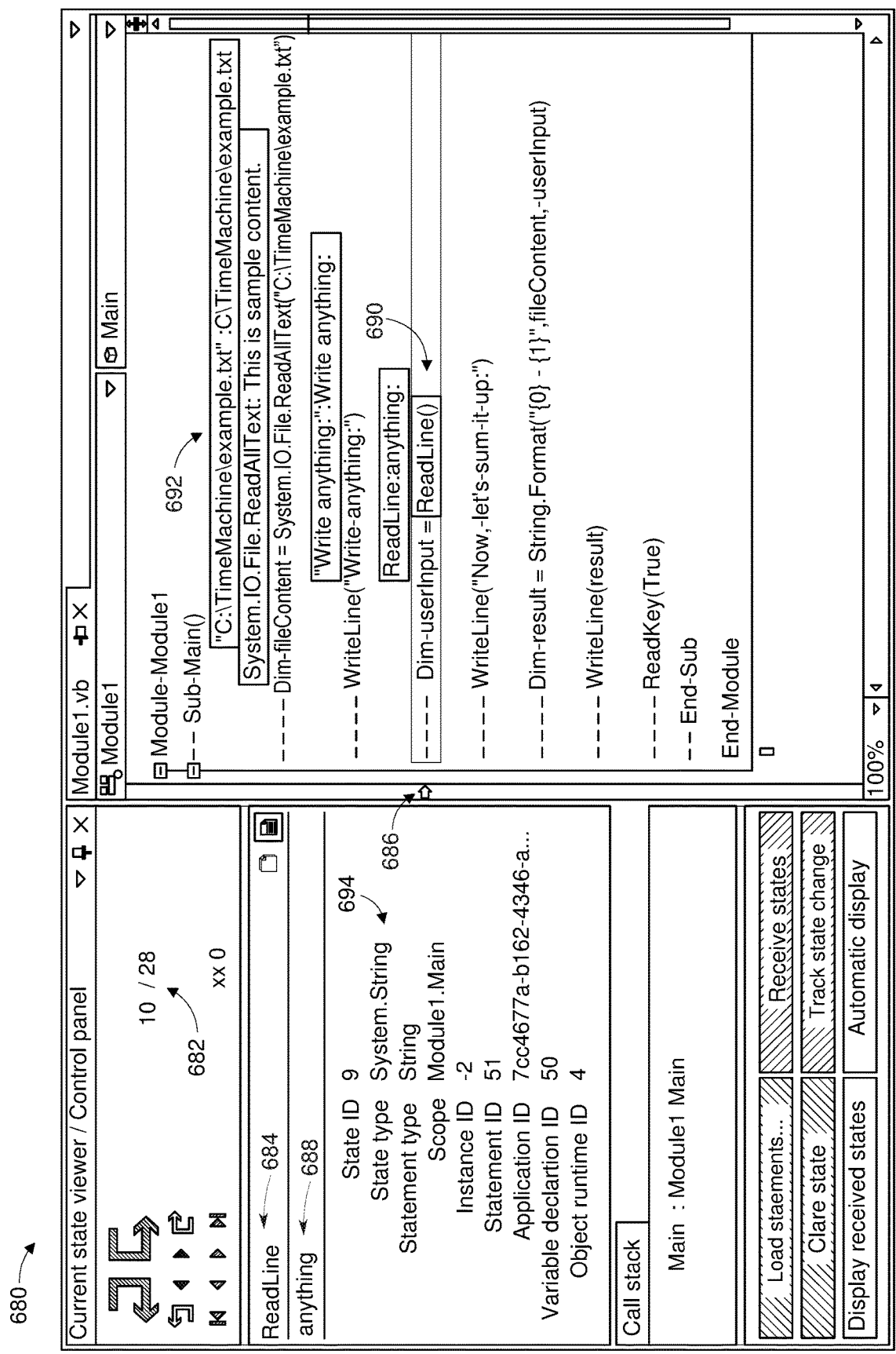

Referring to FIG. 6E, illustration 680 shows a display of State 10 out of 28 (reference 682), providing an example display of reading in an input from the user when executing the program, according to some embodiments. In this case, the object or function in question according to reference 684 is the function "ReadLine." According to reference six or 88, the input being fed into this function is the string "anything." In-line indicator 686 shows what line is being examined. Furthermore, the highlighted portions 690 shows what portion of the code is being executed in State 10. Also, the various gray boxes 692 provide additional annotations for the content of the variables at each line of code that has already been run. Various other registry information 694 may also be displayed for State 10 in the current state viewer panel, according to some embodiments.

In general, the software debugger tool of the present disclosures may allow a user to view any and all of the states that were executed by the program, including viewing them forwards in time, backwards in time, or jumping around to a particular state specified by the user. At each recorded state, various annotations and statuses about that state may be displayed, similar to the examples described in FIGS. 6A through 6E.

Referring to FIG. 7, illustration 700 provides another example display view for providing additional information, according to some embodiments. Here, a symbol view panel 705 may also be displayed, showing a list of values that are populated for variables by this particular stage in the code. For example, at this stage in the code according to the in-line indicator arrow 710, two variables have been populated: "fileContent," and "userInput." Thus, the symbol view panel 705 may provide a more holistic view of certain information that may be useful for debugging. History of accessing (read) and setting of values can be accessed here as well. Clicking on any given variable will list all values that the variable was used in with a visual indication for whether it was set or read, according to some embodiments.

Figure 8A:
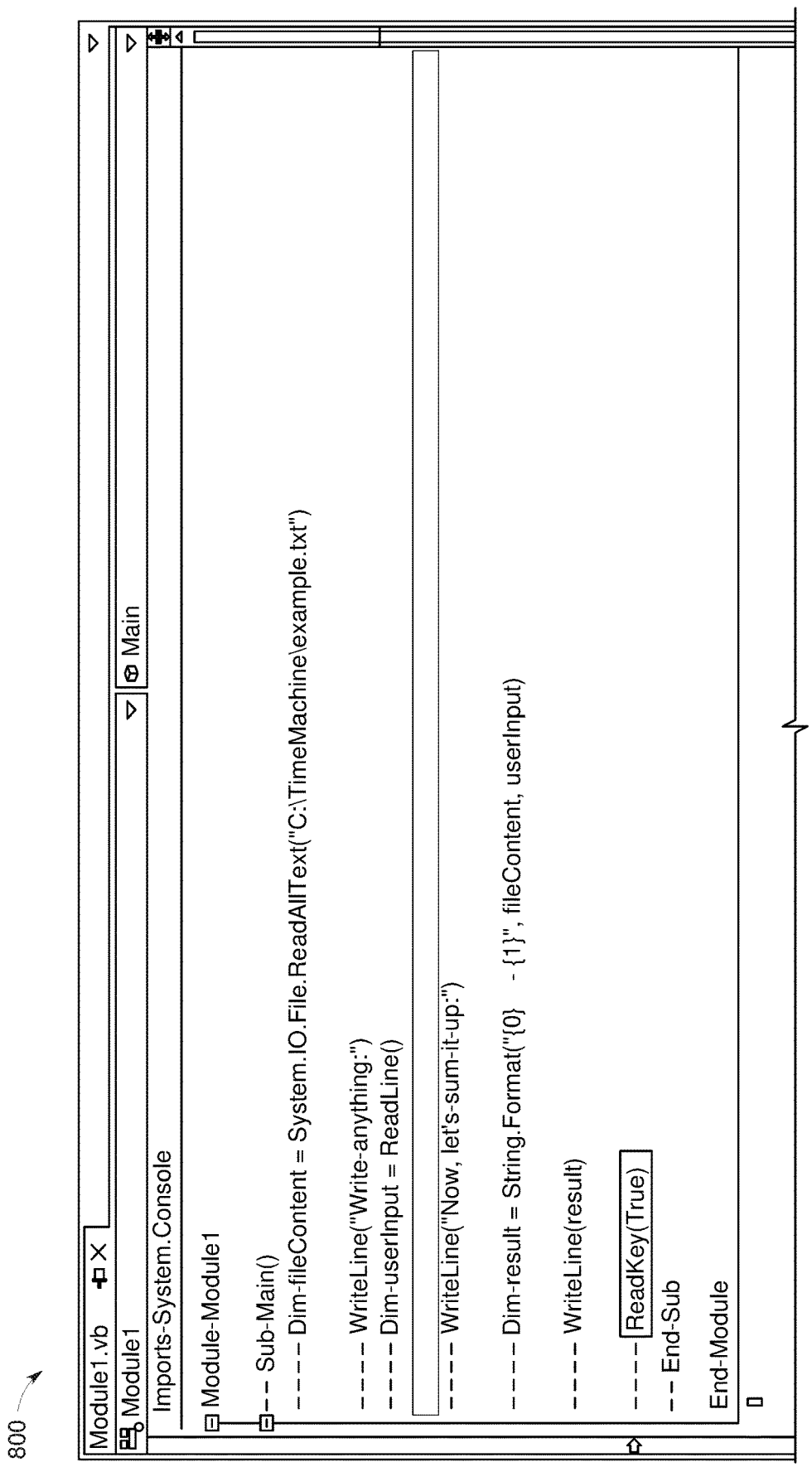

Referring to FIG. 8A, illustration 800 shows a clean view of the example source code used in these various examples. The view in illustration 800 shows generally the source code without any annotations provided by the software code debugger of the present disclosures. In contrast and for comparison, FIG. 8B and illustration 850 shows an example of the same source code but with various example annotations 860 provided by the software code debugger of the present disclosures.

Referring to FIG. 9, illustration 900 shows a display with additional example features of the software code debugger, according to some embodiments. Here, annotation window 910 is a pop-up window that shows what information is stored in a particular variable or register that is being hovered over by a user's cursor. In this case, the user may have hovered the cursor over the variable 920. The user then may view the current value of the variable, as well as a list of previous values, including an indication that there was no previous value.

Referring to FIGS. 10-1 and 10-2, illustration 1000 shows a more complex example of the software debugger tool, in this case allowing for debugging of a multithreaded application, according to some embodiments. Here, portions of source code of an example multithreaded program are shown. Conventional software debugger aids struggle with capturing the various states of a multithreaded program for a given moment in time while pausing the execution of the application. However, aspects of the present disclosure capably and reliably trace all states of a multithreaded application for its whole runtime, as well as provide a novel display for capturing the recorded states of all the threads in parallel. In this case, the example source code of the multithreaded program includes displaying an output 1010 for any handled exceptions, as well as displaying an output 1015 for any unhandled exceptions.

Example Implementation Details

In some embodiments, analysis and instrumentation of the target application is made inside the compilation process pipeline. It is split and takes place in part during the parsing and lexing phase of the compilation process and also during lowering and generating debugging information phases of the compilation process.

The analysis works on the Abstract Syntax Tree (AST) of the target application, and uses hints that are available during the lowering phase of the compilation process. The result is a modified—after lowering phase—AST and lowering metadata. Using the network based system 105, for example, to implement the architecture in FIG. 2, instrumenting the source code may be performed in a computer-implemented method in the following way, according to some embodiments:

1. Undoing some of the syntax-sugar to allow addition of recording statements into the code.
2. Enhancing classes to have their unique identifiers embedded. Shared code may be required to perform recording of a single event can but does not need to be embedded as well. Sometimes inlining it into the class allows to take advantage of more aggressive compiler optimizations.
3. Enhancing object constructors including static ones to generate for each instance a unique identifier of this particular instance and perform other operations that can be cached for all subsequent executions of recording statements.
4. Finding all the pointcuts that should be instrumented for recording to happen (i.e., finding all the events and possible code paths that take place in the code).
5. Finding all the pointcuts that can be determined by prior recorded values and store information that would allow such calculation in generated mapping file. No code instrumentation takes place for those.
6. Analyzing of how and if it is possible to not break the program's control flow to compound recording of values to a one recording statement.
7. Adding recording statements in code places where assigning values to variable values takes place.
8. Adding recording statements of method/properties/static initializers enters, exits and calls.
9. For some special events in the code, like beginning of web requests or input/output access additional instrumentation takes place to record even more accessible information.
10. Generating a mapping file with all of the generated unique identifiers to enable a straight forward way of matching recording to source code.
11. Generating, in the lowering phase, debugging information that is altered and accounted for all added statements, e.g., offsets for all added code are added or subtracted appropriately in generated code placement data for binary output. This step is crucial and ensures that instrumented code won't leave traces while the debugging application or inspecting stacktraces (generated with exceptions).
12. Changed AST tree is then passed to next compilation phases.

The following are examples of injected additional instrumentation code into an existing source code example. The example is in the form of pseudocode and is agnostic to any particular programming language.

Before Instrumentation:

```
private static void CurrentDomain_ProcessExit(object sender,
System.EventArgs e)
{
    stopwatch.Stop( );
    System.Console.WriteLine("Time: " +
stopwatch.ElapsedMilliseconds.ToString( ));
}
```

After instrumentation, where the non-bolded text indicates the code being instrumented and bolded text indicates the instrumentation code injected by aspects of the present disclosure:

```
private static void CurrentDomain_ProcessExit(object sender,
System.EventArgs e)
{ try {
RevDeBug.Storage.MethodEnter(unique_identifiers,
method_parameters);
RevDeBug.Storage.BeforeExecute
(unique_identifier_of_pointcut);
stopwatch. Stop( );
RevDeBug.Storage.InterlineAfterAndBeforeExecute
(unique_identifier_of_po
intcut);
System.Console.WriteLine("Time: " +
RevDeBug.Storage.StoreExecute<string>
(stopwatch.ElapsedMilliseconds.ToSt
ring( ));
RevDeBug.Storage.AfterExecute(unique_identifier_of_pointcut);
    } finally {
RevDeBug.Storage.MethodExit(unique_identifiers);
}}
```

As shown, for each method execution, instrumented code stores the event of MethodEnter which also stores values of parameters passed to the method. Serialization of complex objects might be postponed to the moment they are actually used by the code to not cause side-effects (like in the case of lazy proxies from commonly used ORM frameworks). Custom, user defined, serialization mechanisms can be invoked here as well.

To ensure recording of MethodExit event whole method body is wrapped inside the try-finally block. If an existing block of this type exists, it is extended to include the debugger instrumentation code.

Contents of the method body are instrumented for each subsequent invocation of a statement BeforeExecute and AfterExecute events are recorded, for places between two statement executions only one event is recorded but it might be recorded as two separate events if necessary. Values of variables and/or methods returning values are wrapped into storage clauses according to their type. Wrapping have to take into consideration types of values themselves and expected returned types, as those two can differ.

Constant values are not recorded nor wrapped as it is unnecessary and can be determined afterwards when the recording is accessed.

Loops need an additional event recorded on each iteration that will allow storage of current loop's "index" variable, as the loop might not continue to the moment when the variable's value would be used. The following is the example code for handling a loop:

```
public static void ReferenceConversion( )
{
    Foreach (var referenceConversion in sampleStringArray)
    {
        var path = Path.Combine(referenceConversion);
    }
}
```

When instrumented, this becomes (where again bold text is the injected instrumented code:

```
public static void ReferenceConversion( )
{ try {
RevDeBug.Storage.MethodEnter(unique_identifiers);
    Foreach (var referenceConversion in sampleStringArray)
    {
RevDeBug.Storage.LoopAnchor(unique_identifier_of_pointcut,
referenceConversion);
        var path = RevDeBug.Storage.StoreExecute<string>(
unique_identifier_of_pointcut,Path.Combine
(RevDeBug.Storage.Store<string>(
unique_identifier_of_pointcut,referenceConversion)));
    }
} finally {
RevDeBug.Storage.MethodExit(unique_identifiers);
}}
```

Where LoopAnchor is the event that ensures storage of loop's iterator value. Inlining LoopAnchor call might be advisable in cases of compiler's loop unrolling.

As .NET methods are first class objects accessible through lambda/closure syntax, it is also crucial to treat those in a similar manner to normal method definitions. Similar languages like .NET may have similar solutions. Taking an example pseudo-code, where the text marked in italics and bold represents the marked lambda/closure expression defining a new anonymous method:

```
List<Item> opponentCards = new List<Item>( );
opponentCards.Select(c => new { x = c.x }).ToArray( );
```

This may be transformed and stripped from syntax-sugar that made it so concise and instrumented as (where again, bold with no italics represents instrumented text):

```
List<Item> opponentCards =
RevDeBug.Storage.StoreExecute<global::System.Collections.
Generic.List<global::C
ards.Item>>( unique_identifier_of_pointcut , new List<Item>( ));
    RevDeBug.Storage.StoreExecute(unique_identifier_of_pointcut,
opponentCards.Select(c => {try{
RevDeBug.Storage.MethodEnter(unique_identifier_of_pointcut,
method_parameter);
    return new { x = RevDeBug.Storage.Store<int>(
unique_identifier_of_pointcut, c.x) }; } finally {
RevDeBug.Storage.MethodExit(unique_identifiers);
}}).ToArray( ));
```

To ensure the instrumentation does not introduce double code execution when storing values, for some syntax constructions, it will introduce new temporary variables that would not clash with other local variables. As an example, here is a standard string interpolation:

```
private static void StringInterpolationTest( )
{
    string interpolatedString = $"Hello there. The clock is
    now {DateTime.UtcNow}";
}
```

In pseudo-code it would be transformed into:

```
private static void StringInterpolationTest( )
{try {
RevDeBug.Storage.MethodEnter(unique_identifiers);
        var RDBTempVar000001 =
RevDeBug.Storage.Store<string>
(unique_identifier_of string_interpolation_pointc
ut, DateTime.UtcNow);
    string interpolatedString =
RevDeBug.Storage.Store<string>
(unique_identifier_of_pointcut, $"Hello there. The
clock is now {RDBTempVar000001}");
    } finally{
RevDeBug.Storage.MethodExit(unique_identifiers);
}}
```

Introduction of new temporary variables have to be performed in order of their predicted evaluation and during the lowering phase code points for those changes have to be adjusted to ensure that eventual stacktraces generated on those variable assignments would behave the same as in the original code.

Regarding additional example implementation details and description of the RevDeBug (RDB) Module 205, the RDB Module 205 is a shared library that provides additional functionalities for instrumented applications regarding recording process. The following are some examples of the additional functionalities provided by the RDB Module 205:

1. Shared dispatch mechanisms that allows plug & play and even hot swap (i.e., when application is running) changes to where the recording begins its save or send to.
a. By default it supports saving a whole recording to a disk file(s),
b. sending it via network to a recording server, and
c. storing it in memory and keeping only defined history of recording and exposing it via dedicated API to software developers to use in their error handling procedures. This allows, for example, the recording with only a minimal performance penalty, as the most expensive operation is the actual storing to a disk file, in a production environment and get the recording for the last number of web requests when one of the pages would encounter an erroneous condition.

2. Forcing a breakpoint in code when the recording indicates a user-defined event or condition happened.

While running under the active debugger, the RDB platform can automatically enforce a breakpoint when some or all defined conditions were recorded. For example, as the recording also holds information of execution time for each statement and method, it can automatically add breakpoints after slower events/statements were detected during application runtime.

3. Includes shared compression mechanisms for optional and highly recommended compression of recording (it is cheaper to perform in memory compression for a recording stream than to write around ten times more bytes directly to a disk media).

4. (User defined) customizations of how to record particular values/events.

As a vast part of the work is determined during the compilation phase, RevDeBug allows a software developer to specify custom procedures to record and store objects' values and full properties trees and the like (e.g., whole HTTP request context with cookies, form values, query string, server session, caches, etc.). Allowing for such customization of recording process during runtime would bear too heavy a performance penalty to be considered viable. Such customizations are embedded in a precompiled form in part inside RDB Module 205.

Customization mechanisms can also be used to provide user data anonymization to either not include the data at all, serializing them to empty values, or replacing them for pre-defined or runtime generated data (as sum controls or data pertaining to similar patters as source data but with random values).

The RDB Module 205 can be, but does not have to be, embedded into instrumented binaries. The former allows for the introduction of changes without the need of recompiling the whole application.

Regarding additional detail and example implementation of the Application States Recorder 225, the ASR 225 is a set of shared procedures that serializes different type of values and information of various events that can be executed by the traced application 220. It is tailored to provide binary and runtime optimized ways to serialize and store common types of objects and their derivatives provided by the application's platform (e.g., Microsoft .NET). It allows the debugger to pass the weight of deciding how to record a particular type of value or event to compile time and only execute a fast and simple static method call/statement execution during runtime instead of performing types comparisons and costly dynamic dispatch.

The ASR 225 might be provided as a shared library that will be called by instrumented code or it might be embedded in application classes or methods (e.g., in addition to instrumented code performing the recording). The former method produces greatly larger output binaries but also reduces costly method calls and allows for more aggressive compilation optimizations.

Regarding additional detail and example implementation of the RDB Viewer 235, the RDB Viewer 235 might be integrated into a software developer's integrated development environment (IDE) and can access recordings from a few different sources:

a. Named pipe—for live replaying of recordings in progress on the software developer's machine.
b. Reading of binary file—for replaying past recordings coming for the same or different computers.
c. Reading a recording stream from recording server—Viewer can request stream of recording that was captured or processed by recording server. This way it can get only interesting part of the recording and its context (e.g., events that happened near the interesting ones and/or dependent on variables/values that are read/set there).

According to some embodiments, when the RDB Viewer 235 accesses a recording it processes it in following way:

1. Decompressing—the recording most often is saved to the disk/sent through the network in highly compressed form as compression in memory can be and is in most cases faster than sending over network or saving to a disk an uncompressed stream.
2. Post processing—most or all events and information that at the moment of compilation could be known that can be determined from the recorded data is not instrumented and thus not recorded, trace of all of those events/information are written to mapping file (compilation metadata) and used when accessing the recording, in essence those are:
a. Adding calculated events/values
b. Reconstructing stack trace
c. Reconstructing method trace (e.g., in what part/structure of the method given event happened; was it part of a loop, or conditional branch of execution?)
d. Ordering of recording (via created dependency graph), it will be described in more detail when recording of multithreaded applications is considered.

Additionally after post processing, to make using and finding interesting events/values faster, RDB Viewer 235 creates:

3. Index for full-text searching of variables values (including context information when the variable/parameter was set/used and extended information for exception and http request/response objects).
4. Index for RDB QL queries—a tailored in-memory or on-disk database used to perform fast queries for underlying data model of the recording. It does not need to store all of the recording information except all the metadata one can query for and references for values inside original uncompressed recording stream.

After opening the recording inside the developer's IDE, for each step of the recording the user is presented with:

5. Overlay directly on the source code for all recorded variable's values, returned values, whether conditionals where true or false, etc. In most cases, when looking for a software bug, the software developer doesn't necessarily know what exactly to look for and overlaying all processed values over source code helps in learning how the application behaved and why. This is in conjunction to being able to trace the application runtime, in a sense, back in time allows for a more natural reasoning about how the bug happened going back from the cause of the bug (it might be an exception) to a real root cause of it (like not sanitized input data or just a plain error in the code, etc.).
6. Reverse call stack and method stack (stepping through and out of loops, conditionals, etc., in forward and backward direction). Call stack (also called stacktrace) is presented in a reverse order as it is more natural to have the latest method accessed always visually in the same place rather than have to scroll the whole list to find it for large enough call stacks.
7. Static analysis of common locking patterns with runtime recording allows pinpointing multithreaded hazards in execution paths that actually happened.
8. For some types of thrown exceptions, program slicing is performed using normal or recurrent RDB QL queries. Using programmable RDB QL queries can provide and also give the user power to provide a quick and reusable way to pinpoint all the relevant places in source code where actions that contributed to this particular exception being thrown happened. For example, for NullReferenceException (i.e., Object to which a message was passed doesn't exists/is NULL), query finds all references to the unique identifier of the object's reference and tries in a recurrent way to find the first place where the null value was passed (it might be that it won't find one, in that case it traces the first declaration of an object as its value was never set and that's the earliest place when it could). For ConnectionIsClosedException, it traces all method calls for Close( ) and/or Open( ) methods on the underlying and uniquely identified connection object, etc.

Multithreaded Example Embodiments

Figures 1, 11A:
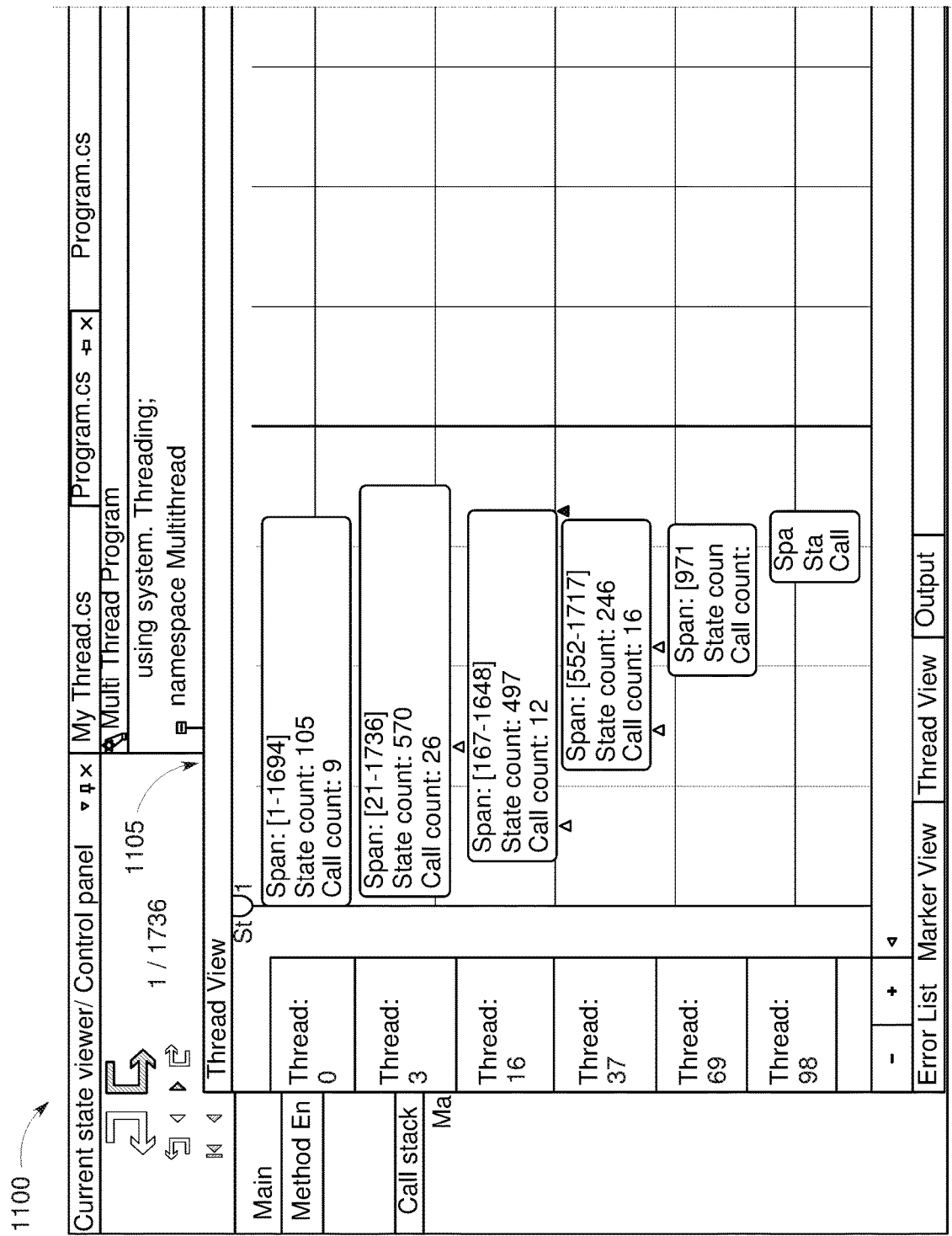
Figures 2, 11A:
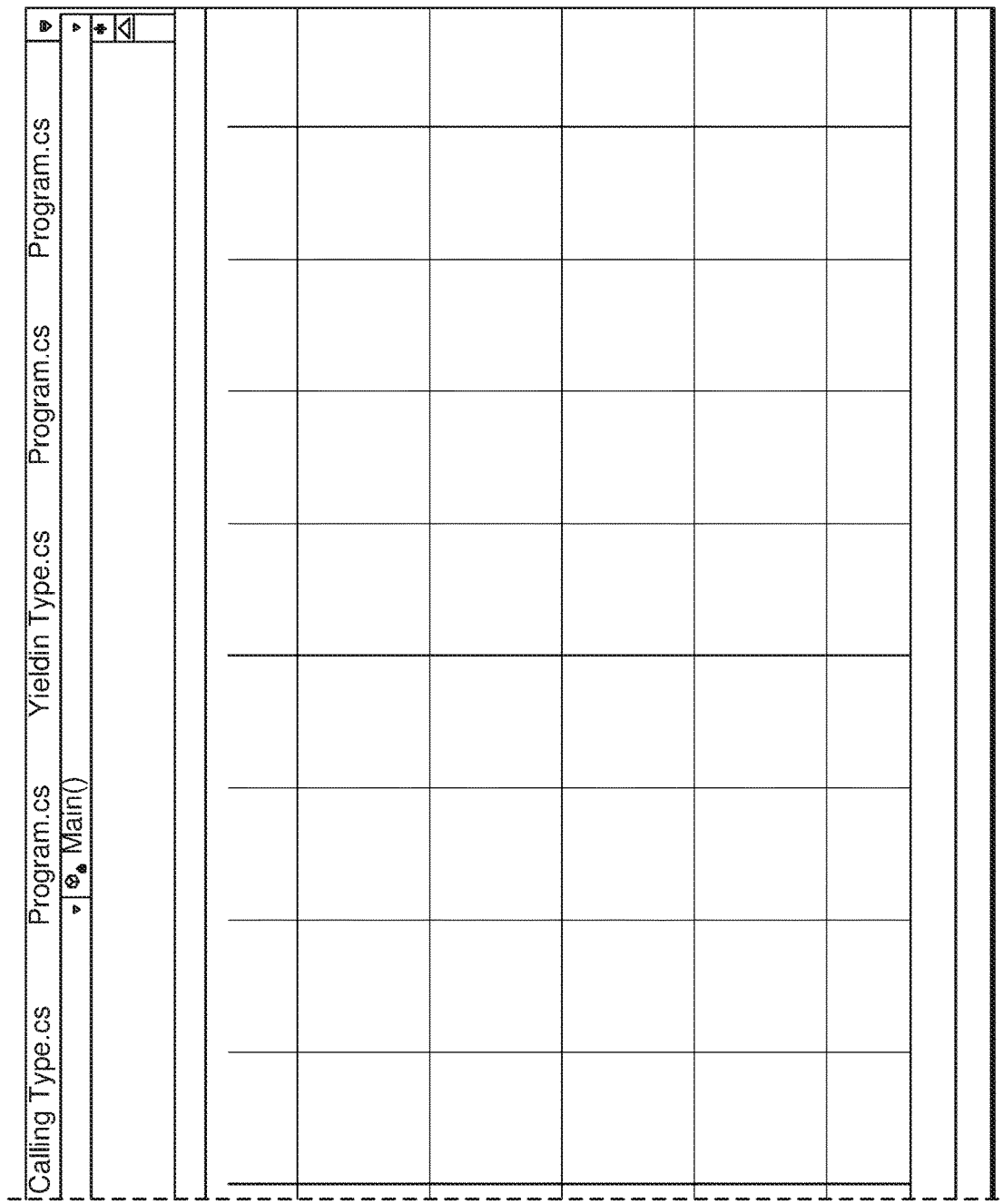

Referring to FIGS. 11A-1 and 11A-2, illustration 1100 provides an example output of the various recorded states after compiling and executing the multithreaded source code application in illustration 1000. Here, the thread view display screen 1105 shows a high-level summary of all of the threads that were instantiated by the source code and high-level statistics of what happened within each thread. Bars running along the thread view 1105 indicate a graphical depiction of the number of actions or operations being performed within each thread. In some embodiments, arrows or other colored markers along the threads may indicate when handled exceptions and unhandled exceptions occurred or may indicate states found via a user defined RDB Query Language query.

Figure 11B:
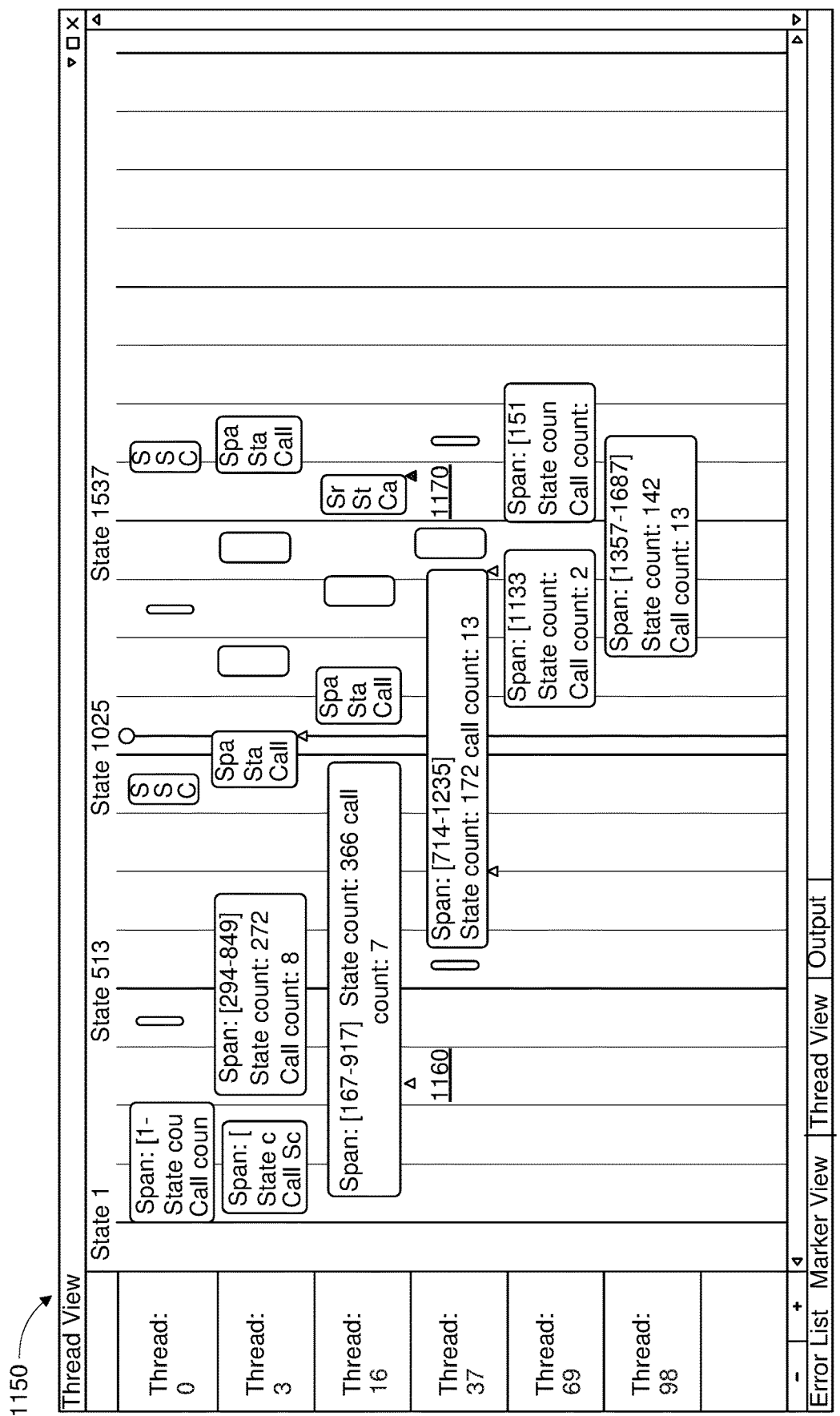
Figures 3, 12:
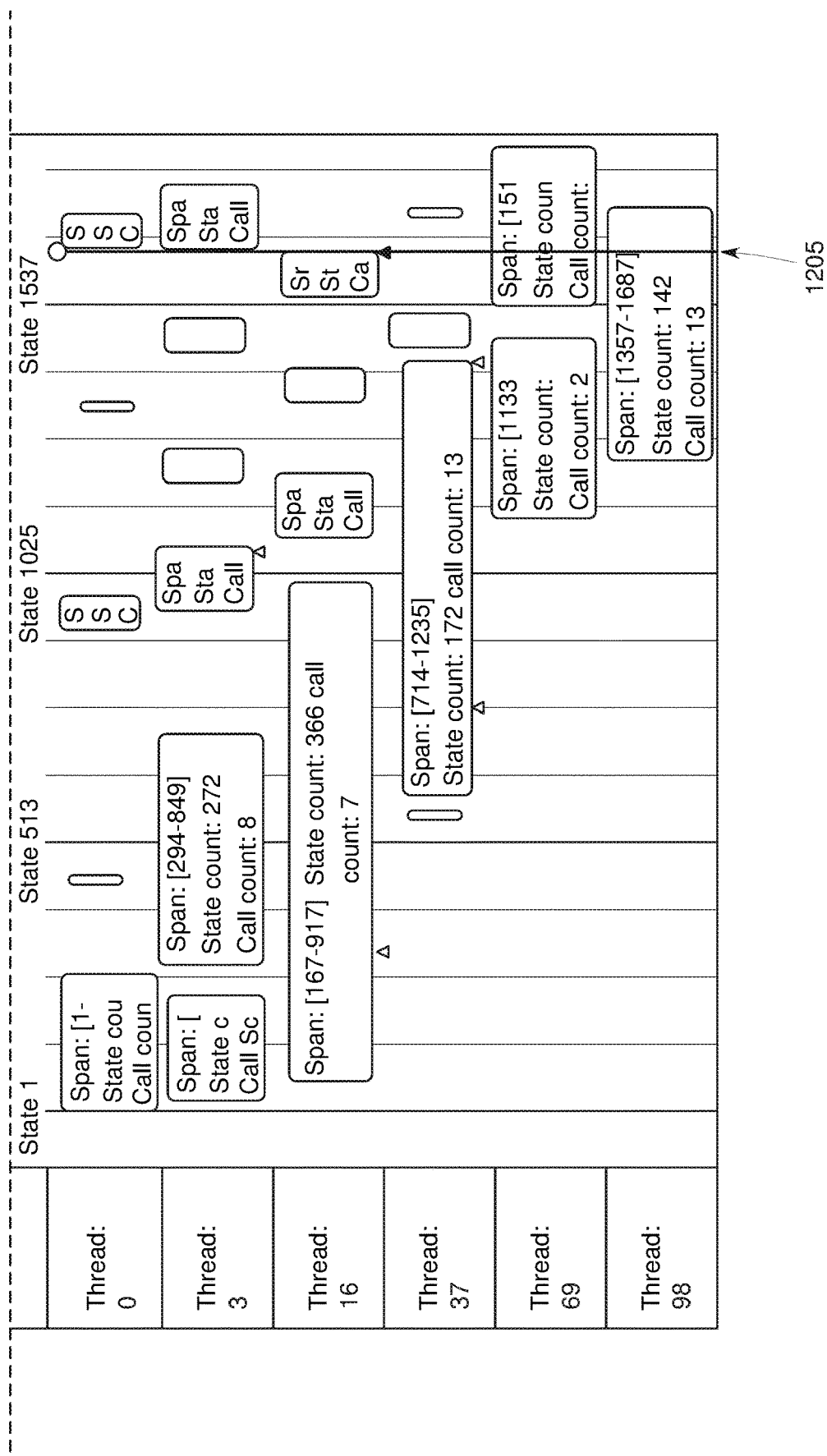

Referring to FIG. 11B, illustration 1150 provides a more detailed view in the thread view of the operations occurring within each thread and at what points in time they occurred. That is, the progression of the executed code over time may be thought of as spanning along the thread view 1150 in the horizontal direction to the right. Various vertical lines provide markers to indicate the progression of states over time (e.g., State 1, State 513, State 1537, etc.). From this display, it can be seen in greater detail which threads were being executed at any state. In this case, the yellow triangle markers, such as marker 1160, show when a handled exception occurred. Also, any red triangle markers, such as marker 1170, show when and unhandled exception occurred. This thread view 1150 also reveals that, even though an unhandled exception occurred in one of the threads, the other threads continued performing operations, and the program presumably failed only because the thread with the unhandled exception could not proceed when it was finally its turn again.

Referring to FIGS. 12-1, 12-2 and 12-3, illustration 1200 provides a superimposed view of the thread view with the corresponding source code. The user may within the thread view to examine any particular state that has been recorded by this multithreaded application. In this example, the user has selected this state at which the unhandled exception occurred, as indicated by the highlighted line 1205. Correspondingly, the display window with the source code provides annotations 1210 that inform the user what are the values of the certain variables that may have caused the program to fail. From that point, a software developer can move "backwards in time" to determine exact conditions upon which the error occurred. It may be apparent then that finding, isolating, and determining root causes of errors in program code may be achieved far quicker through the software code debugger according to the present disclosures.

In some embodiments that utilize the multithreaded functionality, certain example implementation details are relevant to be considered compared to single threaded applications. For example:

1. While recording of multithreaded applications, the recording process is not overly concerned in order of program actions. In some embodiments, the debugger tool of the present disclosure, e.g., RDB, also doesn't necessarily aim to achieve complete consistency for multithreaded applications as it would require running application using a uniprocessor model, which at the end is like running whole application only using one single CPU thread which is not viable for modern multithreaded applications and would artificially impose severe performance penalties on a recorded application. Instead using heuristic methods and data gathered during static code analysis performed by the compiler, RDB aims for eventual consistency while presenting recorded events/values. This approach can give satisfactory results for most of debugging problems software developers face today.

2. In some embodiments, the recording during runtime follows loosely the process laid below:

A. Instrumented code on the thread that executes the application code adds values/events to be serialized to a shared non blocking queue.

B. The method that queues the values tries to perform the less actions it can to not block the executed code, but it does have capability to block application thread when it gets feedback from one of the recording-storing threads that queues are becoming too large. (e.g., Application executes too fast comparing to saving the recording and such a trend in memory consumption of the recording can cause running out of memory). It's main responsibility is queue serialization of value/event and store a timestamp of action performed/completed. All of those method action can be inlined by the compiler so no method execution would take place (and no new stack allocation, etc.)

C. Timestamp or time difference of action performed/completed can be done in different ways according to resolution of timescale that have to be used, generally for method executions a quick timestamp can be used but for faster operations other low level mechanisms can be used to determine time difference from last action executed. The timestamp is not used as a main rule of ordering events in the recording just as an additional hint so it doesn't have to be at best available time scale all the time or hardly ever.

D. The recording queue is consumed by serialization threads. The queue is filled not with references to values but by a full method reference to best suited for the value serialization method as it could be determined by the compiler during compilation phase. That's why no dynamic dispatch takes place, just normal method execution. Those too could be inlined by the compiler, but in most cases won't lead to much performance gains (too much inlined code will quickly exceed the CPU cache available).

E. The serialization threads don't consume a live version (e.g., to which execution threads add values) of the queue but one that was detached after certain amount of data recorded, or consummation of last queue took place whichever happened first. The switching between live and detached queue is done as an atomic operation and is the only place where any non-optional locking like mechanisms are applied to execution threads.

F. Serialization threads execute serialization methods passed by execution threads and apart of serialized values also store unique identifiers of host object (where the method was executed), guest object (on what object a method was called/property accessed). Those two are generated during runtime and only once for every object in their static class initialization block, which is injected as an instrumented code by the compiler. Unique identifier of executed thread is read from underlying operating system and cached. Other unique identifiers are set during compilation phase and are static for a whole program execution.

G. Next number of recording threads compresses the serialized queue and sends the compressed stream via named pipes or network or write it to the disk (in case of writing it to disk the number of recording threads is set to one, but it might be higher when recording to more than one file as recoding server is performing by default).

H. Recording threads can pass feedback to instrumented code on the execution threads to slow down program's execution when the stored queue grows too fast and too large to prevent running out of available memory.

3. Reading and processing the recording from a multithreaded application additionally have to reorder recorded application states to achieve eventual consistency while presenting data. Using data from static analysis of the code during compilation it creates two dependency graphs, one for when and by what parts of the code variables are used and second what places of the code are executed before/after one another. Those dependency graphs and information taken from recording about unique identifiers recorded for statement that was recorded, host class and host object, class and object that action was performed on, thread identifier and recorded value it reorders events to fulfil at minimum a state when no values are being used before they were set. This minimum condition can still leave a vague area when more than three different threads set a shared value (/wrote to memory segment) as it would present a proper order (e.g., present it last) for the one that set the value that was used afterwards, but the order of remaining two, which were never used by the application could be presented differently than it actually happened.

Example Method for Tracing and Recording States

FIGS. 13-17 provide support for an example process for generating the recorded states and various annotations described in the descriptions of the example use cases in FIGS. 3-12, according to some embodiments. The whole process is divided into two main phases. The first phase is compilation and building output files, which is performed by the compiler (see, e.g., RDB Compiler, FIG. 13 and FIG. 2). The second phase includes starting the application (e.g., executing the program of the source code), recording received states and viewing them. Both phases are separate from each other and can be done on different workstations (for example—application can be compiled and build on developer's computer, but it may be run on a tester's computer).

Phase One—Compilation and Building Output

Figure 13:
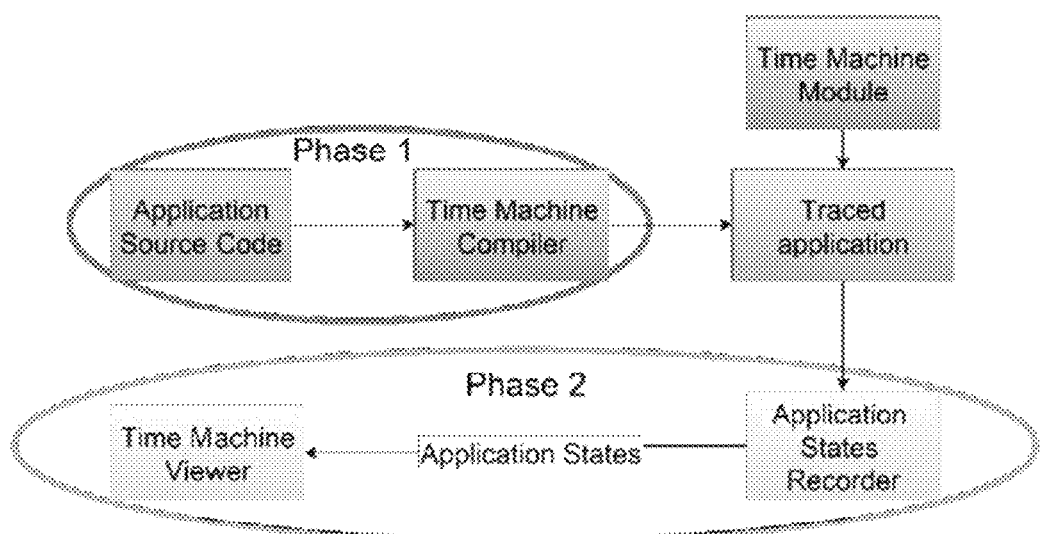
FIG. 13 references two phases of the debugger tool, according to some embodiments.
Figure 14:
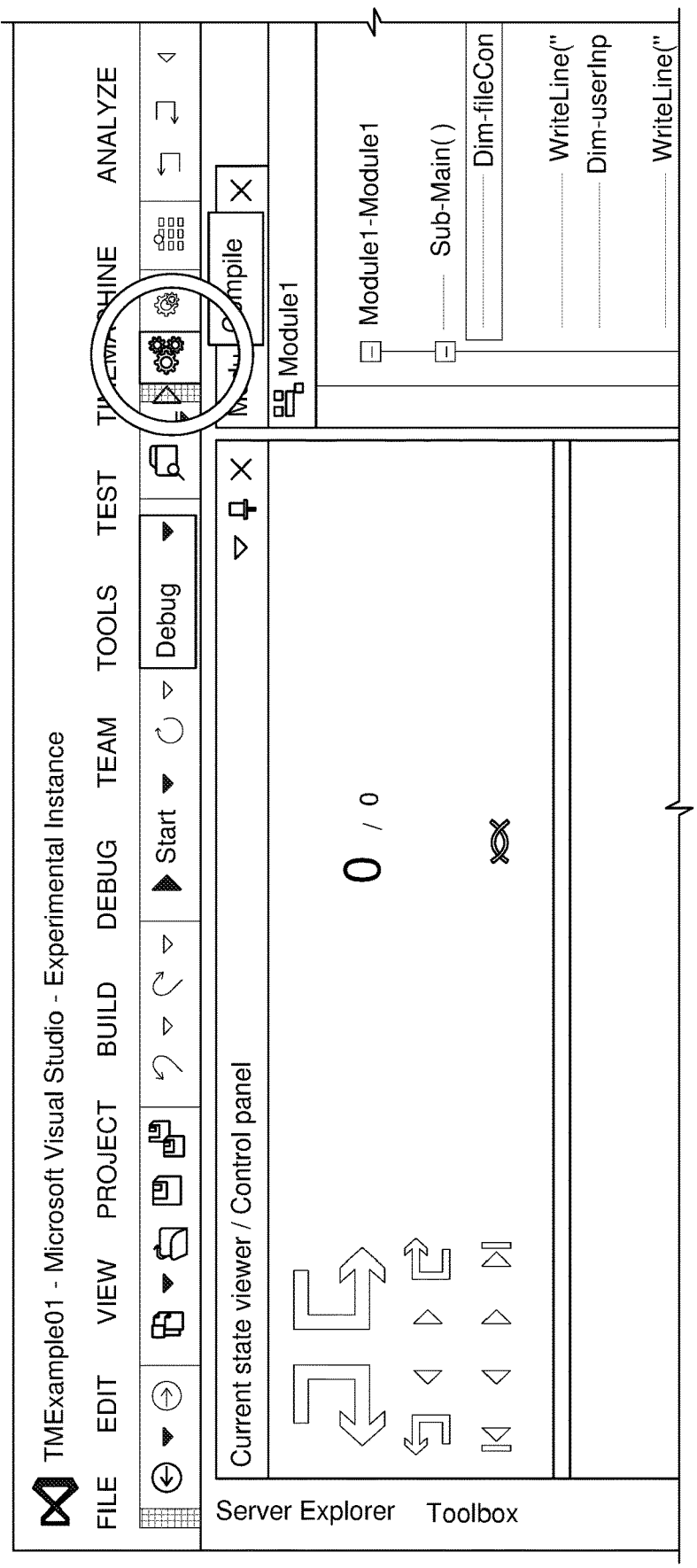
FIG. 14 highlights an example button or icon for building the project of the source code using the RDBCC.

Before tracing the operations executed by an application of the source code, the application must be built, such as through the RDB Code Compiler (RDBCC) (see FIG. 13, FIG. 2). RDBCC injects additional instrumentation code into the existing source code of the traced application, compiles the modified source code and builds output files that can be used in the next steps. Each change in existing source code must be followed by an additional build process using RDBCC. Modifications that are made by RDBCC to the original source code are not stored and they do not override existing files—they are performed in memory only and are used solely used for compilation and build output files. FIG. 14 highlights an example button or icon for building the project of the source code using the RDBCC.

Figure 15:
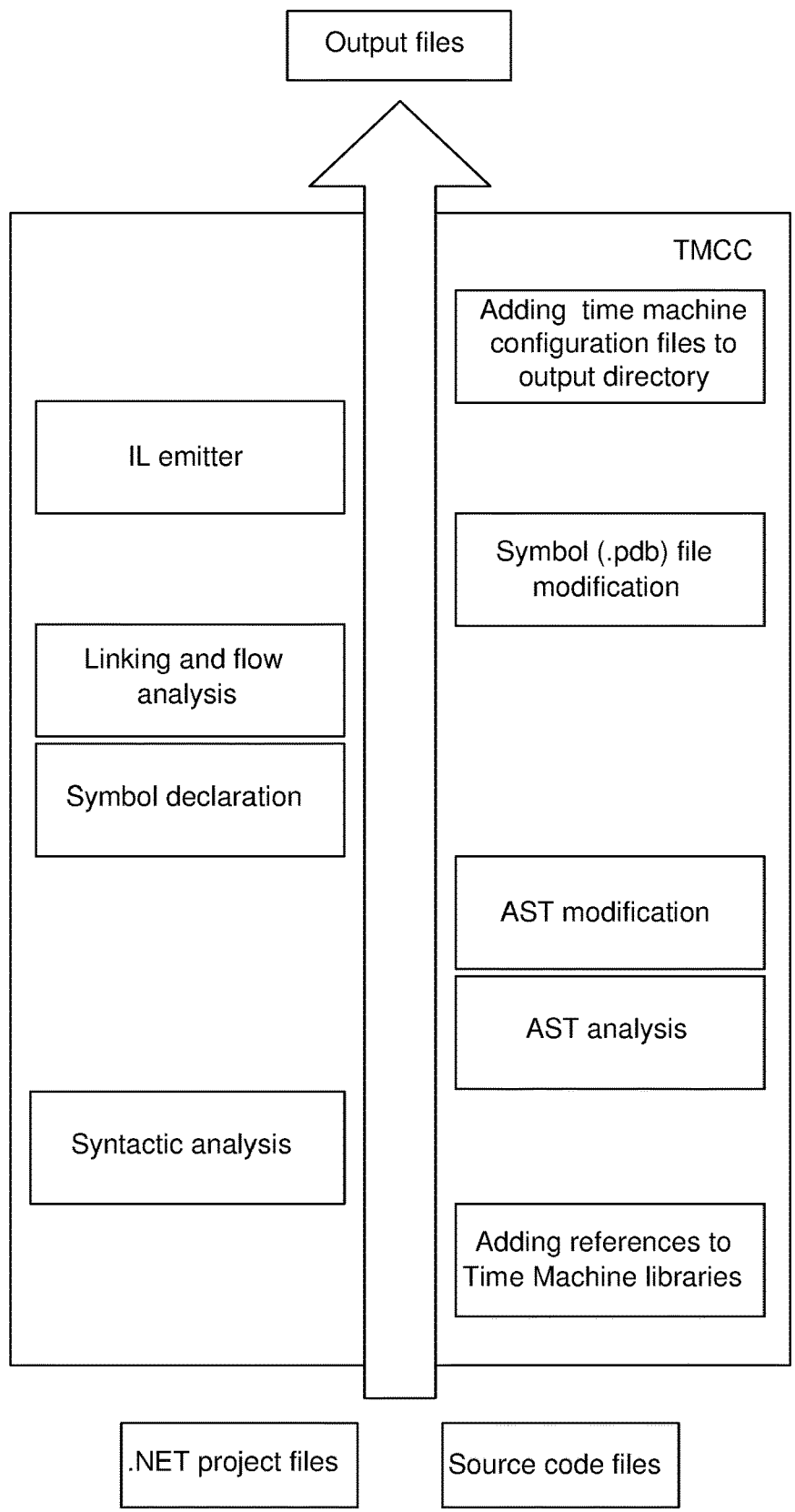
FIG. 15 shows a standard compilation pipeline unmodified on the left, and on the right added additional routines that are included by the software debugger of the present disclosures that are executed at proper times, according to some embodiments.

RDBCC may be an improvement over the existing Roslyn Compiler (open source project from Microsoft), which adds the tracing and the state recording functionality of the present disclosures (See FIG. 15—standard compilation pipeline is left unmodified, while on the right added additional routines are included by the software debugger of the present disclosures that are executed at proper times).

Example Compilation and Building Phase Step by Step

1. Adding references to RDB libraries (RDB Module). This allows RDBCC to properly reference objects and methods that are used in instrumentation process;

2. AST (Abstract Syntax Trees) analysis—Roslyn compiler parses each source code file and provides single AST object for each file which are analyzed by the RDB algorithm. Based on collected data RDB preparing list of suitable places for code injection;

3. AST modification—RDBCC adds additional nodes in AST tree, which are equivalent of code, calling instrumentation function from RDB Module. If it is necessary, RDB can also alter flow of function call, by adding try/finally/catch blocks. Example:

This is a code in C # from original file: var word="Hello";
This is the same line after AST modification, converted back into a source code:
   var word=TimeMachine.Storage.Store<string>(6,null, "Hello");

4. Symbol file modification—excess instrumentation instructions will generate additional sequence points used by standard .NET debugger. Because of that, normally generated symbol file would be unusable in debug session of application build using RDBCC. Symbol file modification removes additional sequence points, allowing normal usage of standard debug features of Microsoft Visual Studio.

5. Adding RDB configuration files—additional files with configuration, which allows using different state recorders.

Phase Two—Recording and Viewing

Figure 16:
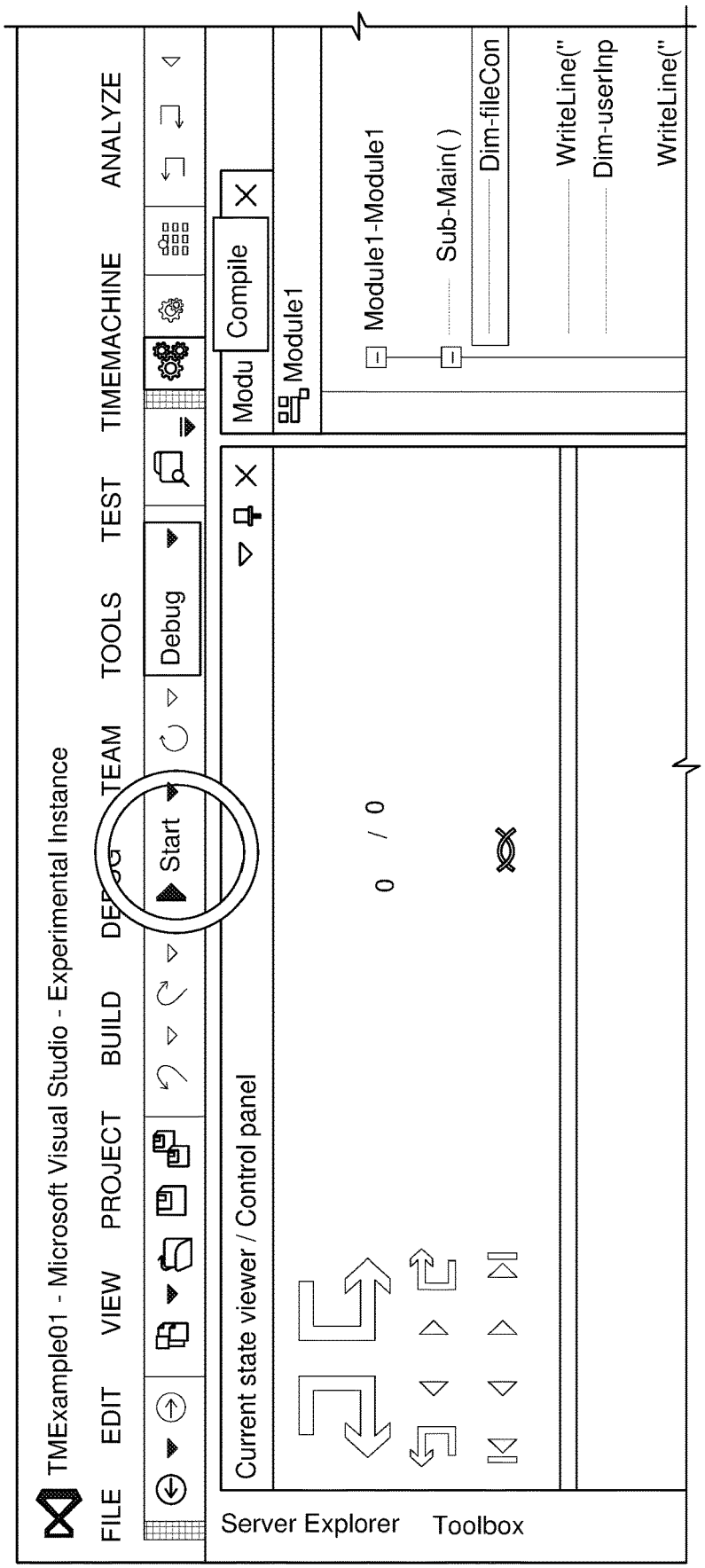
FIG. 16 highlights a button or icon that may be pressed to begin running the traced application and ultimately view the end recorded states and other annotated features to enhance viewing of the original source code, according to some embodiments.
Figure 17:
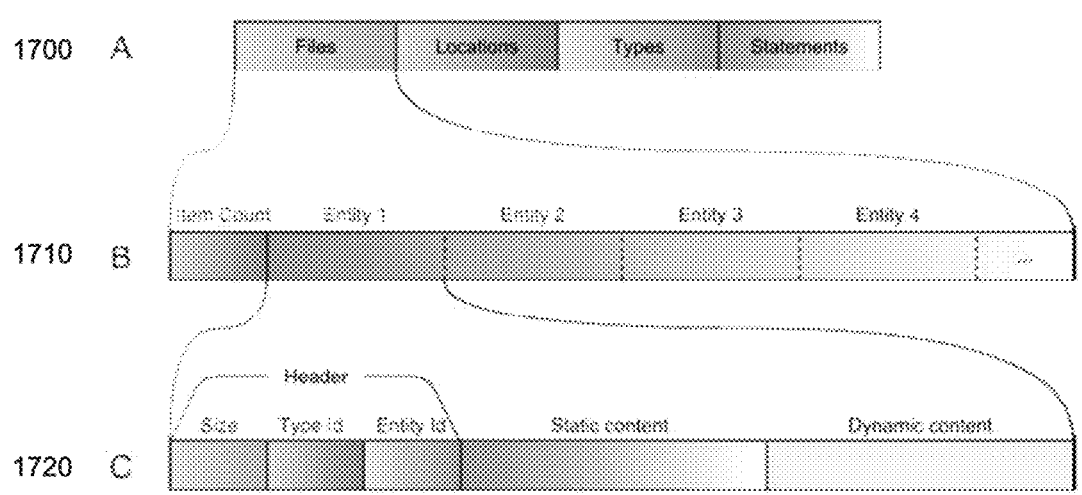
FIG. 17 shows how the RDB Statements file can be divided into four sections.

After the compilation process using RDBCC, the software debugger tool in some embodiments automatically loads all data needed for a RDB session and the user can begin using the traced application. The traced application can be run with or without conducting a formal debugging session—states are recorded independently of the debugger, such as the debugger in the .NET environment. The compilation can output optimized release program binaries or optimized debug builds. FIG. 16 highlights a button or icon that may be pressed to begin running the traced application and ultimately view the end recorded states and other annotated features to enhance viewing of the original source code.

Example Steps of RDB State Recording

1. Traced application executes next code that modifies its internal state. If there is no more code to be executed, application terminates.

2. RDB Module checks whether this is the first code execution. If false, go to step 4.

3. RDB Module adds hooks for unhandled exceptions and initializes necessary objects.

4. RDB Module checks whether it is not connected to State Recorder. If false, go to step 6.

5. RDB Module initializes connection with State Recorder based on supplied configuration. If State Recorder is unavailable, go to step 1.

6. RDB Module prepares application state object based on executed code.

7. RDB Module packs created object and sends it using established connection.

8. Go to step 1.

Each application state received by State Recorder is stored in until a viewer application for displaying the recorded states asks for this data. The user can view received data using proper function calls of RDB Control Panel (See FIGS. 3-1, 3-2 and 3-3 for example).

As an example of this process, the received data is passed to an inner component called Virtual State Machine, which processes application states and provides data sources for different views, like:

Floating tags with expression value (grey boxes in code view),
Current state viewer,
Thread viewer (multi thread application visualization),
Marker viewer (list of recorded handled or unhandled exceptions or user defined conditions),
Symbol viewer (list of variables within current scope).

Example Data Structures

In some embodiments, a unique file format is included that define some internal structures of the software code debugger of some aspects of the present disclosure. For example, a RDB Statements (RDBSX) format is a unique data format for description of the debugger's internal structures created using the RDB Compiler (see FIG. 2). It is composed of collection of lists containing self-referencing objects. Each object represents either a file, location, type or statement. Below is an example description of these objects, according to some embodiments.

File Object

Each file object describes single file containing source code that is used in the compilation process. In some embodiments, the RDB Compiler uses two data fields in this object type:

Path—absolute or relative path to source code file

SHA1—hash generated using SHA1 cryptographic algorithm.

Location Object

For referencing text span in source code files, the RDB Compiler uses a location object. Each location object provides following data fields:

SpanStart—location of the first character in referenced text span

SpanLength—length of referenced text span

Line—number of lines in which referenced text span starts

File—file object describing source code file containing referenced text span

Type Descriptor Object

In some embodiments, the RDB Statements uses its own format for describing types that are either defined or initialized within compiled application. During compilation, type descriptors are used in code transformation and syntax tree processing. During application run, type descriptors provide information needed to correctly process and view received data. This object type provides following data fields:

CodeDef—character string containing type definition

FullName—character string containing type full name with namespace

Category—internal type descriptor category

ContainsAnonymousType—boolean value, stating whether described type contains anonymous type. If described type is generic type, this value is based on parameter types associated with current generic IsArray—boolean value, stating whether described type is array IsExternal boolean value, stating whether described type is declared outside of available source code IsPointer—boolean value, stating whether described type is pointer IsVoid—boolean value, stating whether described type special void type Declaration—reference to statement object, which contains declaration of described type BaseType reference to type description object containing information about based type of described type Parameters—if described type is generic type, this field contains array with references to type descriptor objects of all parameters used by current generic.

Statement Object

Statement objects in RDB Statements have broad usage, from describing single invocations and binary operations to determining a location of named type definitions. Collection of statement objects generated from a single source code file can be organized into a tree structure, functionally similar to an abstract syntax tree. Each statement object type inherits from an abstract BaseStatement type, which provides the following data fields:

Identifier—character string containing unique identifier of statement

Parent—reference to parent statement object

Scope—reference to statement object, that describes scope for current statement

Kind—unique value for each statement object type

IsStaticContext—boolean value used for marking statements in static context (invocations or operations defined within static class or method declaration)

RDBInvocation—Boolean value used for marking statements, that have attached RDB Store/StoreExecute invocation.

Example Binary Format

In some embodiments, the RDB Statements file can be divided into four sections (see FIG. 17, 1700), each containing a list of objects with the same type. A single section (1710) begins with integer value that holds the number of entities in a section's collection, followed by binary representations of every entity. Sections are written into file sequentially as independent binary blocks.

Each entity includes a header, a static content section and a dynamic content section (1720). The header contains essential information, like binary size of the entity, type identifier or an entity identifier. Type identifier holds information about the type of current entity. The entity identifier is used as a key value in primary indexing of the current collection, allowing for fast lookup based on that value. This value is also used for referencing objects.

The static content section contains all static data fields of an entity. Static data field can only hold a value with a constant binary size, that can be determined based on its type, like 32-bit integer, float or boolean values. Entries in the static content section have specified order based on entity type, each entry holds a value of a single static data field.

The dynamic content section holds all dynamic data fields of an entity. Dynamic data fields can have variable sizes, which allows them to store types like character strings or byte arrays. Entries in the dynamic content section have specified order based on entity type, each entry holds binary size and a value of a single dynamic data field.

Referring to FIGS. 18A-18D, the following charts provide a non-exhaustive summary list of various features that are believed to be novel and inventive of at least some aspects of the software code debugger, according to some embodiments. The numbered list does not imply a degree of significance or importance.

A number of these items, such as items 1, 2, 6, 7, 8, 9, 10, 11, 12, 15, 20, 21, 22, 23, 24, 25, 27, 28, 30, 41, 42, 43 may be detailed in the above descriptions.

Regarding items 26 and 45—RDB QL and batch processing for RDB QL: For uncompressed and post processed recording, the RDB creates a database containing a sum of compilation metadata, recorded events and values and determined post-processing data and exposes to the user a query language allowing extraction and filtering of the data. The query language can be executed without RDB viewer and output can be generated to various formats for use inside application testing/building pipelines. So it can be used for example to provide recording of automated or manual testing procedures or as a standalone code quality assurance mechanism as it can detect runtime only code-smells (ie. using exceptions for control-flow or keeping database values in variables of wrong types like storing numbers in string variables, etc.)

Example RDB QL Queries Include:
Finding all Usages of Given Variable:
VariableState.DeclarationId==−1||$Statement.Id==unique_variable_identifier
Finding all Executions of Given Method:
$Statement.Id==unique_method_identifier && $BaseState.Kind==StateKind.Method && state.MethodState.Phase==MethodPhase.MethodEnter
Finding all strings that contains only numbers:
$VariableState.TypeName=="System.String" && !String.IsNullOrWhiteSpace($Variable State.Value) && Regex.IsMatch($VariableState.Value,@"^[\d.,]+$")
Finding all variables that hold null or DBNull value:
$VariableState.TypeName=="{null}"||$VariableState.TypeName=="System.DBNull"

Regarding items 29, 39, 40—variable history viewer, full object state recovery, full array content recovery: Recording of whole object's, arrays, lists, dictionaries (maps), their properties, public members, etc., each time they are referenced would be too expensive. RDB's approach is to make an instrumented code record only changes and uses of those and when the recording is accessed recreate objects' internal state using the recorded values (during post-processing phase).

Traditionally, the inspection of an application state would require making a whole or partial memory dump of an application, but it is too expensive for a continuous application runtime recording. A hybrid approach would need to take into account non deterministic work load characteristics of applications and won't be able to take advantage of performing more during compile time to limit actions performed during runtime.

Using RDB, a software developer can still customize the recording process and force full object serialization where he/she want's it to take place or globally for a given class/object type.

Regarding Item 44—Recording Comparer:
RDB's recordings of different executions of one application can be compared and differences in their execution paths, variable's values, etc., shown. That allows software developer to easily track and find causes of erroneous executions when properly behaving executions are also available.

For each method definition, RDB Viewer takes recording of it from two or more accessible recordings and compares the recorded states for each subsequent statement, in that way it might provide meaningful data also when larger batches of executed code differ between two recordings.

Regarding items 18, 14, 46—recording server, recording data sharing, recording and aggregation based on web request:
RDB provides a stand alone recording server that can be connected via network by applications enhanced with RDB and receive their recording streams. Recording server analyses and post-process the stream as it is being received. It can store it in one or more files and partition the recordings according various defined rules, like for example one file per web request. It also maintains defined by the user resources usage (like disk space) and purges old or dormant data. It also provides a user friendly web based UI and remote API that allows for querying with the use of full-text queries or RDB QL queries, downloading/streaming received recordings, comparing and streaming only the differences and sharing recordings between users. Remote API is used by RDB Viewer to provide those functionalities to a software developer's IDE.

An RDB recording server also can automatically receive via network and store compilation metadata and compiled source code revisions (e.g., sent from build scripts on continuous integration server, or pull from source version control system) and match those with received recordings so the users requesting a recording can receive all needed dependencies for replaying it.

The use of compilation metadata allows to present human readable names set via RDB API usage in the application for various parts of the application code to provide dynamic enablement of disablement of recording for those parts of the application (so it is possible to have critical application parts recorded continuously and dynamically start recording of other parts of application only when users would stumble on errors in those parts).

Regarding item 17—exceptions, existing try/catch/finally blocks:
RDB, during the compilation phase, also instruments existing or adds new try/catch/finally blocks as a requirement for catching and recording thrown exceptions, additionally it uses UnhandledExceptionsHandler and in case of web applications hooks directly into a web server (if API available) or provides a separate http request filter for unhandled exceptions catching. In case of extending existing exceptions handling code only recording instrumentation is being added and when new exceptions handling code blocks are introduces by RDB additional code is being introduced to after recording of the event and valued emulate, in a sense, unhandled nature of the exception (so it is being thrown up into the call stack).

Regarding Items 34, 13—API (Crash Recorder):
RDB provides a rich API for applications to interfere with the recording process (of themselves of other processes). As RDB can store the recording in memory it also provides a way to configure how much of the recording would be retained and available via API to the application in it's own error handling code. It allows software developers to utilize the recording capabilities of RDB with much lower performance penalty than continuous recording to disk or network server and store only limited past data when erroneous condition would be detected.

RDB's API can also be used to enable and disable dynamically recording of the application allowing software developers to introduce not only a simple error reporting functionality to their users but also to enhance them with application's runtime recording and with that developer's instead of trying to replicate errors users' encountered can just replay them.

RDB's API provides also source code level attributes that can instruct the compiler on how or even whether to instrument given code span. Those attributes also allow to name particular parts of application, the names are not embedded inside output binary file but are preserved inside metadata file and can be used to enabled or disable recording for those named parts of application dynamically during runtime (as used especially by RDB recording server).

Regarding Items 4, 18, 33 Tests Generation:
RDB recordings especially collection of recordings and those can be stored on a recording server. Can be viewed as a large dataset of data describing intended or erroneous behavior of applications' code. This dataset can be then used to generate automated testing suites that feed the collected data into chosen methods and checks if those return or don't return data matching past records.

For pure, functionally speaking, methods generated tests are straightforward as those should always return the same values for given set of input parameters. For more complex methods using variable's and object's dependency graph that can be obtained from compilation metadata and runtime recordings mock objects can be created that would allow for automated testing.

Regarding item 3—application state recovery:

When, preferably complete, recording of application runtime is available all the instrumented code wrappers can return not the computed value but one read directly from prior recording. This approach takes runtime values patching to the next level allowing to restore prior state of the application (i.e., re-run with recorded values) in an unsupervised manner. New launch of the application can be lead in this way to the chosen moment in time and then stopped waiting for debugging session to attach.

Extending this approach with the additional use of code hot-swapping via debugging interface and prior construction of variable's, threads and objects dependencies graph can allow for restoring of long running applications in much faster time as objects and threads not used at the target point of restoration don't need to be re-run at all.

Main limitation of this approach is that external resources to the application are not restored, just interaction of application with them is "emulated". It still might be extended to allow for custom procedure to bring external resources to desired state, but it might be very time consuming for UI (UI have to be viewed unfortunately as an external resource for most existing UI frameworks).

In addition, in some embodiments, additional functionalities are contemplated by the present disclosure:

Runtime Patching for Received Values

RDB Module 205 allows for runtime patching of variables' values and introducing conditional executions to instrumented code during runtime. Wrapper methods can not only store computed value but also return a different one which can be defined with custom rules or even read from external storage (like file).

This ability comes with additional performance penalty but it is reduced as rules for runtime patching are provided in a recompiled form and loaded at the application start or dynamically when file holding patching rules changes.

Recording for Memory Constrained Devices.

In addition to recording to the memory and keeping only part of the recording available when the error occurs RDB for memory constrained environments (like mobile devices) can even further limit the way it records and obtains data for recording.

In this scenario static analysis of code during compilation allows to find point cuts that can be described as method exit points, i.e., points when the method execution is passed to another method (with addition of artificially added by RDB error condition exit point for the whole method) and perform only there in memory recording of all local variables and used in the method's code class fields. Those then are stored blocking thread execution this time in localthreadstorage storage mechanism. For each method, if method exit would cause the call stack to collapse, the stored values are being forgotten for that method. That allows to return a shorter recording when error conditions happen that would still present all local variables and/or objects' values that were used during execution (i.e., could participate in generating the error) with in most cases accurate line positions and a stack trace even if the environment nor execution platform doesn't provide such data. It doesn't record changes in time to the variables nor objects but that is a trade off that still gives much more sophisticated information about erroneous condition than typically available.

This method can be used also when targeting not memory constrained devices to gain much better performance.

Source Level Debugger Functionality Emulation Even after Heavy Binary Transformations RDB's runtime patching and recording process with built-in feedback loop mechanism allows to emulate debugging process in environments that don't allow for real debugging (remote or local). It is especially useful when used in transpilation case, ie. when the written codebase is translated onto a different platform so code that is being run and could be in theory be debugged would be presented in the transpiled, autogenerated form (for example running Unity 3D based .NET game inside a web browser using WebGL context, the code that could be debugged within browser is an autogenerated JavaScript code intermingled with also autogenerated Unity 3D engine code; trying to relate "by hand" those to written .NET code is just futile). RDB for such situations can provide an online and on-device (for mobile devices) debugging experience additionally enhanced with capabilities of a reverse debugger.

In general, embodiments of the present disclosure may include combinations of any and all of the examples described. For example, in some embodiments, some, but not all, of the functionality described in FIGS. 18A-18D. In some cases, a debugger of the present disclosure may include the ability to record multithreaded applications as described herein, while other debuggers do not.

Figure 19:
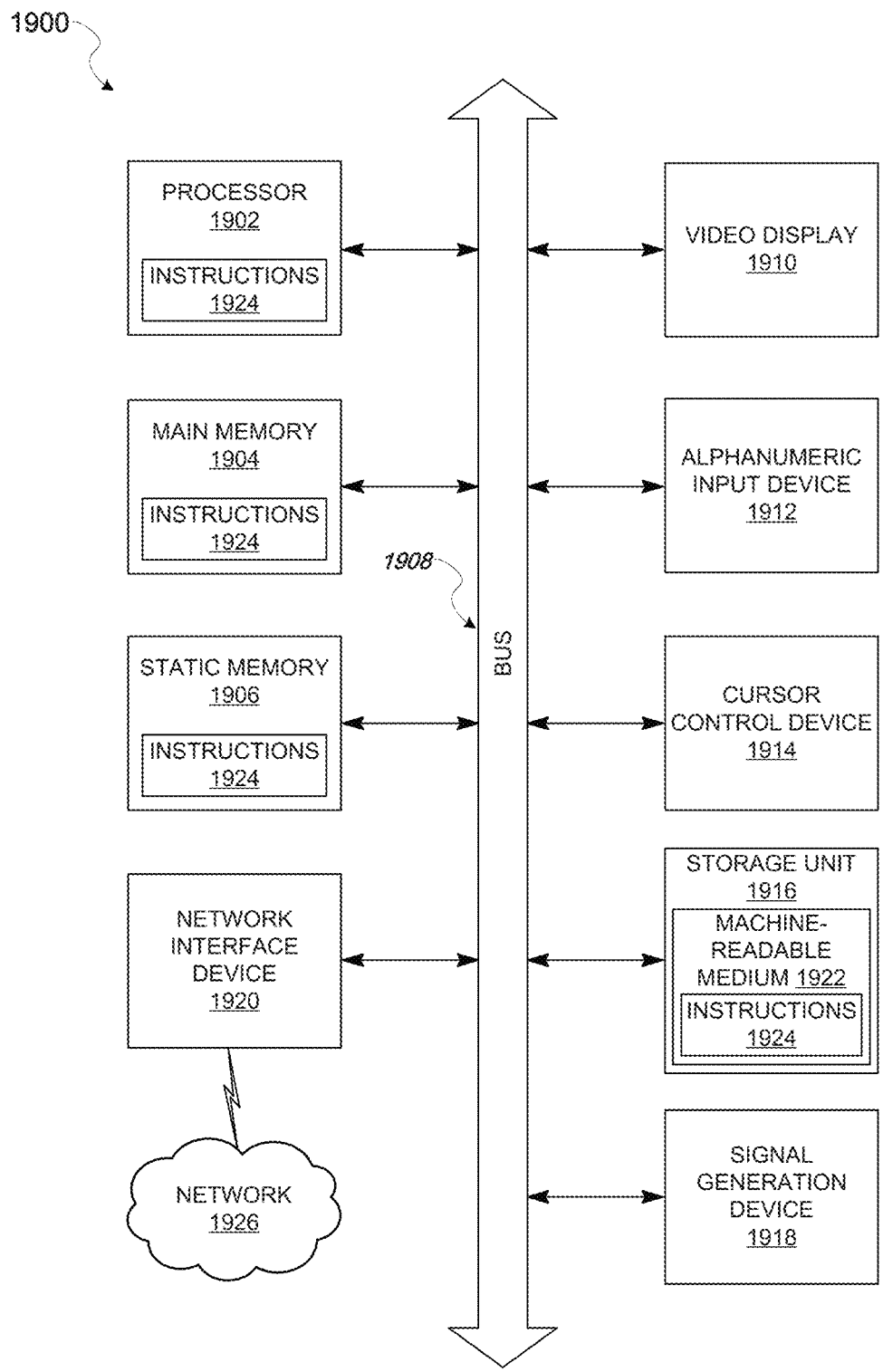
FIG. 19 is a block diagram illustrating components of a machine, according to some example embodiments, able to read instructions from a machine-readable medium and perform any one or more of the methodologies discussed herein.

Referring to FIG. 19, the block diagram illustrates components of a machine 1900, according to some example embodiments, able to read instructions 1924 from a machine-readable medium 1922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 19 shows the machine 1900 in the example form of a computer system (e.g., a computer) within which the instructions 1924 (e.g., software, a program, an application, an applet, an app, or other executable code) for causing the machine 1900 to perform any one or more of the methodologies discussed herein may be executed, in whole or in part.

In alternative embodiments, the machine 1900 operates as a standalone device or may be connected (e.g., networked) to other machines. In a networked deployment, the machine 1900 may operate in the capacity of a server machine 110 or a client machine in a server-client network environment, or as a peer machine in a distributed (e.g., peer-to-peer) network environment. The machine 1900 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1924, sequentially or otherwise, that specify actions to be taken by that machine. Further, while only a single machine 1900 is illustrated, the term "machine" shall also be taken to include any collection of machines that individually or jointly execute the instructions 1924 to perform all or part of any one or more of the methodologies discussed herein.

The machine 1900 includes a processor 1902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1904, and a static memory 1906, which are configured to communicate with each other via a bus 1908. The processor 1902 may contain microcircuits that are configurable, temporarily or permanently, by some or all of the instructions 1924 such that the processor 1902 is configurable to perform any one or more of the methodologies described herein, in whole or in part. For example, a set of one or more microcircuits of the processor 1902 may be configurable to execute one or more modules (e.g., software modules) described herein.

The machine 1900 may further include a video display 1910 (e.g., a plasma display panel (PDP), a light emitting diode (LED) display, a liquid crystal display (LCD), a projector, a cathode ray tube (CRT), or any other display capable of displaying graphics or video). The machine 1900 may also include an alphanumeric input device 1912 (e.g., a keyboard or keypad), a cursor control device 1914 (e.g., a mouse, a touchpad, a trackball, a joystick, a motion sensor, an eye tracking device, or other pointing instrument), a storage unit 1916, a signal generation device 1918 (e.g., a sound card, an amplifier, a speaker, a headphone jack, or any suitable combination thereof), and a network interface device 1920.

The storage unit 1916 includes the machine-readable medium 1922 (e.g., a tangible and non-transitory machine-readable storage medium) on which are stored the instructions 1924 embodying any one or more of the methodologies or functions described herein, including, for example, any of the descriptions of FIGS. 1-18D. The instructions 1924 may also reside, completely or at least partially, within the main memory 1904, within the processor 1902 (e.g., within the processor's cache memory), or both, before or during execution thereof by the machine 1900. The instructions 1924 may also reside in the static memory 1906.

Accordingly, the main memory 1904 and the processor 1902 may be considered machine-readable media 1922 (e.g., tangible and non-transitory machine-readable media). The instructions 1924 may be transmitted or received over a network 1926 via the network interface device 1920. For example, the network interface device 1920 may communicate the instructions 1924 using any one or more transfer protocols (e.g., HTTP). The machine 1900 may also represent example means for performing any of the functions described herein, including the processes described in FIGS. 1-18D.

In some example embodiments, the machine 1900 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1922 able to store data temporarily or permanently and may be taken to include, but not be limited to, random-access memory (RAM), read-only memory (ROM), buffer memory, flash memory, and cache memory. While the machine-readable medium 1922 is shown in an example embodiment to be a single medium, the term "machine-readable medium" should be taken to include a single medium or multiple media (e.g., a centralized or distributed database 115, or associated caches and servers) able to store instructions 1924. The term "machine-readable medium" shall also be taken to include any medium, or combination of multiple media, that is capable of storing the instructions 1924 for execution by the machine 1900, such that the instructions 1924, when executed by one or more processors of the machine 1900 (e.g., processor 1902), cause the machine 1900 to perform any one or more of the methodologies described herein, in whole or in part. Accordingly, a "machine-readable medium" refers to a single storage apparatus or device 120 or 130, as well as cloud-based storage systems or storage networks that include multiple storage apparatus or devices 120 or 130. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1922 is non-transitory in that it does not embody a propagating signal. However, labeling the tangible machine-readable medium 1922 as "non-transitory" should not be construed to mean that the medium is incapable of movement; the medium should be considered as being transportable from one physical location to another. Additionally, since the machine-readable medium 1922 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1922 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1902 or a group of processors 1902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1902 or other programmable processor 1902. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1908) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1902 that are temporarily configured (e.g., by software) or permanently configured to perform the relevant operations. Whether temporarily or permanently configured, such processors 1902 may constitute processor-implemented modules that operate to perform one or more operations or functions described herein. As used herein, "processor-implemented module" refers to a hardware module implemented using one or more processors 1902.

Similarly, the methods described herein may be at least partially processor-implemented, a processor 1902 being an example of hardware. For example, at least some of the operations of a method may be performed by one or more processors 1902 or processor-implemented modules. As used herein, "processor-implemented module" refers to a hardware module in which the hardware includes one or more processors 1902. Moreover, the one or more processors 1902 may also operate to support performance of the relevant operations in a "cloud computing" environment or as a "software as a service" (SaaS). For example, at least some of the operations may be performed by a group of computers (as examples of machines 1900 including processors 1902), with these operations being accessible via a network 1926 (e.g., the Internet) and via one or more appropriate interfaces (e.g., an API).

The performance of certain operations may be distributed among the one or more processors 1902, not only residing within a single machine 1900, but deployed across a number of machines 1900. In some example embodiments, the one or more processors 1902 or processor-implemented modules may be located in a single geographic location (e.g., within a home environment, an office environment, or a server farm). In other example embodiments, the one or more processors 1902 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 1900 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A computer implemented method for providing software debugging functionality to a target source code, the method comprising:
   accessing, by a processor configured to provide the software debugging functionality, the target source code, the target source code written in a high level computer program language;
   compiling, by the processor, the target source code prior to any execution of the target source code; the compiling including:
      injecting, by the processor using a compiler algorithm, debugging functionality and recording functionality source code into the target source code that is interspersed between a plurality of statements of the target source code, the debugging and recording functionality source code comprising reference calls to one or more libraries outside of the target source code configured to provide recording functionality of a plurality of logical states; and
      converting the debugging functionality and recording functionality source code and the target source code into a low level computer program language;
   executing the converted target source code to completion;
   recording, using a separate module existing outside of the converted target code, at different points in time, associated with the injected functionalities and during the execution of the converted target source code, the plurality of logical states of the target source code using the converted debugging functionality and recording functionality source code, each state of the plurality of logical states comprising at least one of: a value of a variable declared in the target source code, a runtime exception, a declaration that a function was executed, a declaration that a variable was used, and a declaration that a loop is being iterated, wherein the plurality of logical states are recorded independently of a debugging status for each of the logical states; and
   displaying at least one of the recorded states of the target source code in an application interface readable to a human user.

2. The method of claim 1, wherein the target source code comprises a variable that is modifiable to change, during run-time execution, into a first value at a first time, and a second value that is different from the first value, at a second time that occurs later than the first time, the method further comprising:
   recording the first value of the variable as part of the recording of the plurality of logical states;

recording the second value of the variable as part of the recording of the plurality of logical states;
receiving a user input through the application interface to examine the variable; and
generating an output in response to the user input that simultaneously displays:
the first value;
a first expression that the first value represents a previous state of the variable;
the second value; and
a second expression that the second value represents a current state of the variable.

3. The method of claim 1, further comprising:
displaying in the application interface a first state of the recorded states, the display of the first state comprising:
the target source code; and
an interface superimposed over at least a portion of the target source code configured to display a first value of a variable in the target source code that represents a current value of the variable during the first recorded state.

4. The method of claim 3, further comprising:
receiving a first user input from the application interface to view a second state of the recorded states that occurred earlier in execution run-time than the first state;
displaying in the application interface the second state of the recorded states, the display of the second state comprising:
the target source code; and
the interface superimposed over at least the portion of the target source code and further configured to display a second value of the variable in the target source code that represents a previous value of the variable during the earlier second state;
receiving a second user input from the application interface to view a third state of the recorded states that occurred later in execution run-time than the first state;
displaying in the application interface the third state of the recorded states, the display of the third state comprising:
the target source code; and
the interface superimposed over at least the portion of the target source code and further configured to display a third value of the variable in the target source code that represents a later value of the variable during the later third state.

5. The method of claim 1, further comprising:
receiving a first user input to view a first state of the target source code during execution of the target source code;
displaying the first state of the target source code;
receiving a second user input to view a second state of the target source code that occurred earlier than the first state during execution of the target source code; and
displaying the second earlier state of the target source code.

6. The method of claim 1, further comprising:
receiving a user input to display a sequence of the recorded states in reverse chronological order; and
displaying the recorded states in successive frames in reverse chronological order.

7. The method of claim 1, wherein the target source code comprises multithreaded code, and displaying the recorded states comprises displaying multiple threads of the target source code in each recorded state.

8. A system comprising:
at least one processor;
at least one memory coupled to the processor; and
at least one display interface;
the at least one processor configured to:
access a target source code, the target source code written in a high level computer program language;
compile the target source code prior to any execution of the target source code; the compiling including:
injecting, using a compiler algorithm, debugging functionality and recording functionality source code into the target source code that is interspersed between a plurality of statements of the target source code, the debugging and recording functionality source code comprising reference calls to one or more libraries outside of the target source code configured to provide recording functionality of a plurality of logical states; and
converting the debugging functionality and recording functionality source code and the target source code into a low level computer program language;
execute the converted target source code to completion;
record, using a separate module existing outside of the converted target code, at different points in time, associated with the injected functionalities and during the execution of the converted target source code, the plurality of logical states of the target source code using the converted debugging functionality and recording functionality source code, each state of the plurality of logical states comprising at least one of:
a value of a variable declared in the target source code, a runtime exception, a declaration that a function was executed, a declaration that a variable was used, and a declaration that a loop is being iterated, wherein the plurality of logical states are recorded independently of a debugging status for each of the logical states; and
cause display, at the at least one display interface, of at least one of the recorded states of the target source code in an application interface readable to a human user.

9. The system of claim 8, wherein the target source code comprises a variable that is modifiable to change, during run-time execution, into a first value at a first time, and a second value that is different from the first value, at a second time that occurs later than the first time, the at least one processor further configured to:
record the first value of the variable as part of the recording of the plurality of logical states;
record the second value of the variable as part of the recording of the plurality of logical states;
receive a user input through the application interface to examine the variable; and
generate an output in response to the user input that causes the display to simultaneously display:
the first value;
a first expression that the first value represents a previous state of the variable;
the second value; and
a second expression that the second value represents a current state of the variable.

10. The system of claim 8, wherein the at least one processor is further configured to:
cause display in the application interface a first state of the recorded states, the display of the first state comprising:
the target source code; and
an interface superimposed over at least a portion of the target source code configured to display a first value of a variable in the target source code that represents a current value of the variable during the first recorded state.

11. The system of claim 10, wherein the at least one processor is further configured to:
receive a user input from the application interface to view a second state of the recorded states that occurred earlier in execution run-time than the first state; and
cause display in the application interface the second state of the recorded states, the display of the second state comprising:
the target source code; and
the interface superimposed over at least the portion of the target source code and further configured to display a second value of the variable in the target source code that represents a previous value of the variable during the earlier second state.

12. The system of claim 8, wherein the at least one processor is further configured to:
receiving a first user input to view a first state of the target source code during execution of the target source code;
displaying the first state of the target source code;
receiving a second user input to view a second state of the target source code that occurred earlier than the first state during execution of the target source code; and
displaying the second earlier state of the target source code.

13. The system of claim 8, wherein the at least one processor is further configured to:
receive a user input to display a sequence of the recorded states in reverse chronological order; and
cause display of the recorded states in successive frames in reverse chronological order.

14. The system of claim 8, wherein the target source code comprises multithreaded code, and displaying the recorded states comprises displaying multiple threads of the target source code in each recorded state in a two dimensional display comprising a first axis showing a plurality of threads and a second axis showing a plurality of recorded states, the two dimensional display further comprising a plurality of bands spanning at least some of the plurality of recorded states, each of the plurality of bands representing when a thread was active across the span of recorded states, wherein at least two of the plurality of bands span at least one of the plurality of recorded states simultaneously.

15. A non-transitory computer-readable medium embodying instructions that, when executed by a processor, perform operations comprising:
accessing a target source code, the target source code written in a high level computer program language;
compiling the target source code prior to any execution of the target source code; the compiling including:
injecting, using a compiler algorithm, debugging functionality and recording functionality source code into the target source code that is interspersed between a plurality of statements of the target source code, the debugging and recording functionality source code comprising reference calls to one or more libraries outside of the target source code configured to provide recording functionality of a plurality of logical states; and
converting the debugging functionality and recording functionality source code and the target source code into a low level computer program language;
executing the converted target source code to completion;
recording, using a separate module existing outside of the converted target code, at different points in time, associated with the injected functionalities and during the execution of the converted target source code, the plurality of logical states of the target source code using the converted debugging functionality and recording functionality source code, each state of the plurality of logical states comprising at least one of: a value of a variable declared in the target source code, a runtime exception, a declaration that a function was executed, a declaration that a variable was used, and a declaration that a loop is being iterated, wherein the plurality of logical states are recorded independently of a debugging status for each of the logical states; and
causing displaying of at least one of the recorded states of the target source code in an application interface readable to a human user.

16. The computer readable medium of claim 15, wherein the target source code comprises a variable that is modifiable to change, during run-time execution, into a first value at a first time, and a second value that is different from the first value, at a second time that occurs later than the first time, the operations further comprising:
recording the first value of the variable as part of the recording of the plurality of logical states;
recording the second value of the variable as part of the recording of the plurality of logical states;
receiving a user input through the application interface to examine the variable; and
generating an output in response to the user input that simultaneously displays:
the first value;
a first expression that the first value represents a previous state of the variable;
the second value; and
a second expression that the second value represents a current state of the variable.

17. The computer-readable medium of claim 15, wherein the operations further comprise:
causing display in the application interface a first state of the recorded states, the display of the first state comprising:
the target source code; and
an interface superimposed over at least a portion of the target source code configured to display a first value of a variable in the target source code that represents a current value of the variable during the first recorded state.

18. The computer-readable medium of claim 17, wherein the operations further comprise:
receiving a user input from the application interface to view a second state of the recorded states that occurred earlier in execution run-time than the first state; and
causing display in the application interface the second state of the recorded states, the display of the second state comprising:
the target source code; and
the interface superimposed over at least the portion of the target source code and further configured to display a second value of the variable in the target source code that represents a previous value of the variable during the earlier second state.

19. The computer-readable medium of claim 15, wherein the operations further comprise:
receiving a first user input to view a first state of the target source code during execution of the target source code;
causing display of the first state of the target source code;

receiving a second user input to view a second state of the target source code that occurred earlier than the first state during execution of the target source code; and causing display of the second earlier state of the target source code.

20. The computer-readable medium of claim 15, wherein the operations further comprise:

receiving a user input to display a sequence of the recorded states in reverse chronological order; and causing display the recorded states in successive frames in reverse chronological order.

* * * * *